(12) United States Patent
Xia et al.

(10) Patent No.: US 11,436,831 B2
(45) Date of Patent: Sep. 6, 2022

(54) METHOD AND APPARATUS FOR VIDEO PROCESSING

(71) Applicant: Alibaba Group Holding Limited, Grand Cayman (KY)

(72) Inventors: Zhurong Xia, Hangzhou (CN); Zhiyuan Geng, Hangzhou (CN); Shiwei Zhang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 17/115,185

(22) Filed: Dec. 8, 2020

(65) Prior Publication Data
US 2021/0201038 A1 Jul. 1, 2021

(30) Foreign Application Priority Data
Dec. 30, 2019 (CN) .......................... 201911395439.8

(51) Int. Cl.
*G06V 20/40* (2022.01)
*G06K 9/62* (2022.01)
*G11B 27/10* (2006.01)
*G11B 27/031* (2006.01)
*G11B 27/06* (2006.01)

(52) U.S. Cl.
CPC ........... *G06V 20/41* (2022.01); *G06K 9/6253* (2013.01); *G06V 20/46* (2022.01); *G11B 27/031* (2013.01); *G11B 27/06* (2013.01); *G11B 27/102* (2013.01)

(58) Field of Classification Search
CPC ............ G06K 9/00718; G06K 9/6253; G06K 9/00744; G06K 9/00751; G11B 27/102; G11B 27/031; G11B 27/06; G06V 20/41; G06V 20/46; G06V 20/47; H04N 21/234; H04N 21/23418; H04N 21/44; H04N 21/44008; H04N 21/4756; H04N 21/84
USPC ....................................................... 386/282
See application file for complete search history.

(56) References Cited

U.S. PATENT DOCUMENTS

| | | |
|---|---|---|
| 5,982,951 A | 11/1999 | Katayama et al. |
| 7,555,718 B2 | 6/2009 | Girgenshoh et al. |
| 8,380,866 B2 | 2/2013 | Savitzky et al. |
| 8,498,978 B2 | 7/2013 | Radhakrishnan et al. |
| 8,589,457 B1 | 11/2013 | Bengio et al. |
| 8,875,023 B2 | 10/2014 | Cronin et al. |

(Continued)

*Primary Examiner* — Loi H Tran
(74) *Attorney, Agent, or Firm* — James J. DeCarlo; Greenberg Traurig, LLP

(57) ABSTRACT

Embodiments of the disclosure provides methods and apparatuses for video processing. In one embodiment, the video processing method comprises: obtaining at least one video from a video repository as a video to be processed; performing semantic recognition on the video in one or more semantic recognition dimensions to obtain one or more video label data items corresponding to the video in the one or more semantic recognition dimensions; generating at least one candidate label combination based on at least one of the one or more video label data items; determining, based on a target label combination selected by a user from the at least one candidate label combination, one or more video clips in the video corresponding to at least one video label in the target label combination; and generating at least one target video clip corresponding to the target label combination based on at least one of the one or more video clips.

14 Claims, 12 Drawing Sheets

(56) References Cited

U.S. PATENT DOCUMENTS

| | | |
|---|---|---|
| 8,892,572 B2 | 11/2014 | Sanjeev |
| 9,467,558 B2 | 10/2016 | Lee et al. |
| 9,508,011 B2 | 11/2016 | Sharon et al. |
| 9,645,724 B2 | 5/2017 | Matas |
| 2005/0216851 A1 | 9/2005 | Hull et al. |
| 2010/0082585 A1 | 4/2010 | Barsook et al. |
| 2010/0169786 A1* | 7/2010 | O'Brien ............... G11B 27/034 |
| | | 715/738 |
| 2012/0008821 A1 | 1/2012 | Sharon et al. |
| 2018/0025079 A1* | 1/2018 | Xiao .................... G06F 16/739 |
| | | 707/722 |
| 2020/0134827 A1* | 4/2020 | Saha ...................... G06V 20/20 |
| 2020/0142928 A1 | 5/2020 | Mei et al. |
| 2021/0064910 A1* | 3/2021 | Meier ..................... G06T 5/005 |
| 2021/0089777 A1* | 3/2021 | Shrivastava ............. G06N 3/08 |
| 2021/0103615 A1* | 4/2021 | Jindal .................... G06F 16/735 |
| 2021/0150719 A1* | 5/2021 | Cowburn ................ G06T 7/194 |

\* cited by examiner

METHOD AND APPARATUS FOR VIDEO PROCESSING

CROSS-REFERENCE TO RELATED APPLICATIONS

The present application claims priority to the Chinese Patent Application No. 201911395439.8 filed on Dec. 30, 2019, which is incorporated by reference herein in its entirety.

BACKGROUND

Technical Field

The disclosure relates to the field of video processing technology, and in particular, to methods and apparatuses for video processing.

Description of Related Art

With the rapid development in network technologies and multimedia technologies, various videos have emerged on the network. While enriching users' lives, these videos also pose difficulties for the users when making choices upon browsing videos on the network. Presently, it is difficult for the user to quickly locate and find videos of interest when presented with volumes of videos in variety. As a result, there exists a need for video interpretation technologies and video processing technologies, which interprets and analyzes the content of videos available on the network via video interpretation technologies such that the key information contained in the videos is analyzed to extract key clips in the video to compose video highlights.

SUMMARY

According to various embodiments, the disclosure provides methods, apparatuses, computing devices, and computer-readable storage media for video processing.

In one embodiment, the disclosure provides a method for video processing, the method comprising: obtaining at least one video from a video repository as a video to be processed; performing semantic recognition on the video in one or more semantic recognition dimensions to obtain one or more video label data items corresponding to the video in the one or more semantic recognition dimensions; generating at least one candidate label combination based on at least one of the one or more video label data items; determining, based on a target label combination selected by a user from the at least one candidate label combination, one or more video clips in the video corresponding to at least one video label in the target label combination; and generating at least one target video clip corresponding to the target label combination based on at least one of the one or more video clips.

In one embodiment, the video label data records video labels of the semantic recognition dimensions and playback time periods in the video corresponding to the video labels.

In one embodiment, generating at least one candidate label combination based on at least one of the one or more video label data items comprises: extracting video labels in video label data items corresponding to at least two semantic recognition dimensions in the plurality of semantic recognition dimensions and corresponding playback time periods in the video, respectively; determining whether the playback time periods corresponding to the video labels that correspond to the at least two semantic recognition dimensions coincide in time; and if so, generating label combinations based on the video labels corresponding to the at least two semantic recognition dimensions as the candidate label combinations.

In one embodiment, after generating at least one candidate label combination based on at least one of the one or more video label data items is performed, and before determining, based on a target label combination selected by a user from the at least one candidate label combination, one or more video clips in the video corresponding to at least one video label in the target label combination is performed, the method comprises: calculating a label combination score corresponding to each candidate label combination based on label weights and label scores of the video labels in the video label data, respectively; filtering the at least one candidate label combination to obtain candidate label combinations having label combination scores satisfying a preset score threshold range; and displaying the obtained candidate label combinations to the user in descending display order of the label combination scores.

In one embodiment, for one or more video clips in the video corresponding to the video labels, a start frame of the video clip is an image frame in the video corresponding to a start time point of the playback time period, and an end frame thereof is an image frame in the video corresponding to an end time point of the playback time period.

In one embodiment, generating at least one target video clip corresponding to the target label combination based on at least one of the one or more video clips comprises: extracting one or more frame sequences corresponding to the one or more video clips from the video based on one or more playback time periods corresponding to the one or more video clips; and generating the target video clip based on the one or more frame sequences and a time sequence of playback time periods corresponding to the extracted one or more frame sequences.

In one embodiment, generating at least one target video clip corresponding to the target label combination based on at least one of the one or more video clips comprises: determining whether a plurality of playback time periods corresponding to the plurality of video clips coincide in time; if so, performing time deduplication on the plurality of playback time periods to obtain at least one deduplicated playback time period; extracting at least one frame sequence in the video corresponding to the at least one deduplicated playback time period; and combining the at least one frame sequence into the target video clip based on a time sequence of the at least one deduplicated playback time period.

In one embodiment, after generating at least one target video clip corresponding to the target label combination based on at least one of the one or more video clips is performed, the method comprises: if a plurality of target video clips is generated, determining video labels in the target label combination corresponding to each target video clip, respectively; calculating a video clip score of each target video clip based on label weights and label scores of the determined video labels, respectively; filtering the plurality of target video clips to obtain target video clips having video clip scores satisfying a preset clip score threshold range; and outputting the obtained target video clips to the user in a descending order of the video clip scores.

In one embodiment, before obtaining at least one video from a video repository as a video to be processed is performed, the method comprises: receiving address information of the video repository that is uploaded by the user; and importing videos in the video repository based on the address information.

In one embodiment, the disclosure provides an apparatus for video processing, the apparatus comprising: a video obtaining module configured to obtain at least one video from a video repository as a video to be processed; a semantic recognition module configured to perform semantic recognition on the video in one or more semantic recognition dimensions to obtain one or more video label data items corresponding to the video in the one or more semantic recognition dimensions; a candidate label combination generating module configured to generate at least one candidate label combination based on at least one of the one or more video label data items; a video clip determining module configured to determine, based on a target label combination selected by a user from the at least one candidate label combination, one or more video clips in the video corresponding to at least one video label in the target label combination; and a target video clip generating module configured to generate at least one target video clip corresponding to the target label combination based on at least one of the one or more video clips.

In one embodiment, the disclosure provides a method for video processing, the method comprising: obtaining a video to be processed submitted by a user; performing semantic recognition on the video in one or more semantic recognition dimensions to obtain one or more video label data items corresponding to the video in the one or more semantic recognition dimensions; generating a target label combination based on the video label data and an input of the user; determining one or more video clips in the video corresponding to at least one video label in the target label combination; and generating at least one target video clip corresponding to the target label combination based on at least one of the one or more video clips.

In one embodiment, the video label data records video labels of the semantic recognition dimensions and playback time periods in the video corresponding to the video labels.

In one embodiment, the generating a target label combination based on the video label data and an input of the user comprises: obtaining video search keywords input by the user; determining one or more video labels in the one or more pieces of video label data corresponding to the video search keywords; and generating the at least one target label combination based on the one or more video labels corresponding to the video search keywords.

In one embodiment, for one or more video clips in the video corresponding to the video labels, a start frame of the video clip is an image frame in the video corresponding to a start time point of the playback time period, and an end frame thereof is an image frame in the video corresponding to an end time point of the playback time period.

In one embodiment, generating at least one target video clip corresponding to the target label combination based on at least one of the one or more video clips comprises: extracting one or more frame sequences corresponding to the one or more video clips from the video based on one or more playback time periods corresponding to the one or more video clips; and generating the target video clip based on the one or more frame sequences and a time sequence of playback time periods corresponding to the extracted one or more frame sequences.

In one embodiment, generating at least one target video clip corresponding to the target label combination based on at least one of the one or more video clips comprises: determining whether a plurality of playback time periods corresponding to the plurality of video clips are consecutive in time; if so, merging the plurality of playback time periods that are consecutive in time into at least one continuous playback time period; extracting at least one frame sequence in the video corresponding to the at least one continuous playback time period; and generating the target video clip based on the at least one frame sequence based on a time sequence of the at least one frame sequence.

In one embodiment, after generating at least one target video clip corresponding to the target label combination based on at least one of the one or more video clips, the method comprises: if a plurality of target video clips is generated, determining video labels in the target label combination corresponding to each target video clip, respectively; calculating a video clip score of each target video clip based on label weights and label scores of the determined video labels, respectively; filtering the plurality of target video clips to obtain target video clips having video clip scores satisfying a preset clip score threshold range; and outputting the obtained target video clips to the user in a descending order of the video clip scores.

In one embodiment, the disclosure provides an apparatus for video processing, the apparatus comprising: a video obtaining module configured to obtain a video to be processed submitted by a user; a semantic recognition module configured to perform semantic recognition on the video in one or more semantic recognition dimensions to obtain one or more video label data items corresponding to the video in the one or more semantic recognition dimensions; a target label combination generating module configured to generate a target label combination based on the video label data and an input of the user; a video clip determining module configured to determine one or more video clips in the video corresponding to at least one video label in the target label combination; and a target video clip generating module configured to generate at least one target video clip corresponding to the target label combination based on at least one of the one or more video clips.

In one embodiment, the disclosure provides a method for video processing, the method comprising: obtaining a video to be processed; performing semantic recognition on the video in one or more semantic recognition dimensions to obtain one or more video label data items corresponding to the video in the one or more semantic recognition dimensions; generating at least one candidate label combination based on at least one of the one or more video label data items; delivering the at least one candidate label combination to a client corresponding to a user to which the video belongs; receiving a target label combination submitted by the client; determining one or more video clips in the video corresponding to at least one video label in the target label combination; generating at least one target video clip corresponding to the target label combination based on at least one of the one or more video clips; an delivering the at least one target video clip to the client.

In one embodiment, the video label data records video labels of the semantic recognition dimensions and playback time periods in the video corresponding to the video labels.

In one embodiment, generating at least one candidate label combination based on at least one of the one or more pieces of video label data comprises: extracting video labels in video label data corresponding to at least two semantic recognition dimensions in the plurality of semantic recognition dimensions and corresponding playback time periods in the video, respectively; determining whether the playback time periods corresponding to the video labels that correspond to the at least two semantic recognition dimensions coincide in time; and if so, generating label combinations based on the video labels corresponding to the at least two semantic recognition dimensions as the candidate label combinations.

In one embodiment, after generating at least one candidate label combination based on at least one of the one or more video label data items, and before delivering the at least one candidate label combination to a client corresponding to a user to which the video belongs is performed, the method comprises: calculating a label combination score corresponding to each candidate label combination based on label weights and label scores of the video labels in the video label data, respectively; filtering the at least one candidate label combination to obtain candidate label combinations having label combination scores satisfying a preset score threshold range; and determining a display priority of the at least one candidate label combination in a descending order of label combination scores; and delivering the at least one candidate label combination to a client corresponding to a user to which the video belongs comprises: delivering to the client the at least one candidate label combination including the display priority.

In one embodiment, for one or more video clips in the video corresponding to the video labels, a start frame of the video clip is an image frame in the video corresponding to a start time point of the playback time period, and an end frame thereof is an image frame in the video corresponding to an end time point of the playback time period.

In one embodiment, generating at least one target video clip corresponding to the target label combination based on at least one of the one or more video clips comprises: extracting one or more frame sequences corresponding to the one or more video clips from the video based on one or more playback time periods corresponding to the one or more video clips; and generating the target video clip based on the one or more frame sequences based on a time sequence of playback time periods corresponding to the extracted one or more frame sequences.

In one embodiment, generating at least one target video clip corresponding to the target label combination based on at least one of the one or more video clips comprises: determining whether a plurality of playback time periods corresponding to the plurality of video clips coincide in time; if so, performing deduplication on the plurality of playback time periods to obtain at least one deduplicated playback time period; extracting at least one frame sequence in the video corresponding to the at least one deduplicated playback time period; and combining the at least one frame sequence into the target video clip based on a time sequence of the at least one deduplicated playback time period.

In one embodiment, generating at least one target video clip corresponding to the target label combination based on at least one of the one or more video clips comprises: determining whether a plurality of playback time periods corresponding to the plurality of video clips are consecutive in time; if so, merging the plurality of playback time periods that are consecutive in time into at least one continuous playback time period; extracting at least one frame sequence in the video corresponding to the at least one continuous playback time period; and combining the at least one frame sequence into the target video clip based on a time sequence of the at least one continuous playback time period.

In one embodiment, after generating at least one target video clip corresponding to the target label combination based on at least one of the one or more video clips, and before delivering the at least one target video clip to the client, the method comprises: if a plurality of target video clips is generated, determining video labels in the target label combination corresponding to each target video clip, respectively; calculating a video clip score of each target video clip based on label weights and label scores of the determined video labels, respectively; filtering the plurality of target video clips to obtain target video clips having video clip scores satisfying a preset clip score threshold range; and delivering the at least one target video clip to the client comprises: delivering to the client at least one target video clip obtained by filtering, wherein the at least one target video clip includes a corresponding video clip score, respectively.

In one embodiment, the disclosure provides an apparatus for video processing, the apparatus comprising: a video obtaining module configured to obtain a video to be processed; a semantic recognition module configured to perform semantic recognition on the video in one or more semantic recognition dimensions to obtain one or more video label data items corresponding to the video in the one or more semantic recognition dimensions; a candidate label combination generating module configured to generate at least one candidate label combination based on at least one of the one or more video label data items; a candidate label combination delivering module configured to deliver the at least one candidate label combination to a client corresponding to a user to which the video belongs; a target label combination receiving module configured to receive a target label combination submitted by the client; a video clip determining module configured to determine one or more video clips in the video corresponding to at least one video label in the target label combination; a target video clip generating module configured to generate at least one target video clip corresponding to the target label combination based on at least one of the one or more video clips; and a target video clip delivering module configured to deliver the at least one target video clip to the client.

In one embodiment, the disclosure provides a method for video processing, the method comprising: receiving at least one candidate label combination delivered by a server; displaying the at least one candidate label combination to a user; receiving a target label combination submitted by the user based on the at least one candidate label combination; submitting the target label combination to the server; and receiving at least one target video clip corresponding to the target label combination returned by the server.

In one embodiment, the at least one candidate label combination delivered by the server includes a display priority of the at least one candidate label combination; and displaying the at least one candidate label combination to a user comprises: displaying the at least one candidate label combination to the user based on the display priority.

In one embodiment, the at least one target video clip corresponding to the target label combination returned by the server includes a corresponding video clip score, respectively; and after receiving at least one target video clip corresponding to the target label combination returned by the server, the method further comprises: displaying the at least one target video clip to the user in a descending order of the video clip scores.

In one embodiment, the disclosure provides an apparatus for video processing, the apparatus comprising: a candidate label combination receiving module configured to receive at least one candidate label combination delivered by a server; a candidate label combination display module configured to display the at least one candidate label combination to a user; a target label combination receiving module configured to receive a target label combination submitted by the user based on the at least one candidate label combination; a target label combination submitting module configured to submit the target label combination to the server; and a target video clip receiving module configured to receive at least one target video clip corresponding to the target label combination returned by the server.

In one embodiment, the disclosure provides a computing device, the computing device comprising: a memory and a processor; wherein the memory is configured to store computer-executable instructions that, when executed by the processor, cause the computing device to perform the following: obtaining at least one video from a video repository as a video to be processed; performing semantic recognition on the video in one or more semantic recognition dimensions to obtain one or more video label data item corresponding to the video in the one or more semantic recognition dimensions; generating at least one candidate label combination based on at least one of the one or more video label data items; determining, based on a target label combination selected by a user from the at least one candidate label combination, one or more video clips in the video corresponding to at least one video label in the target label combination; and generating at least one target video clip corresponding to the target label combination based on at least one of the one or more video clips.

In one embodiment, the disclosure provides a computing device, the computing device comprising: a memory and a processor; wherein the memory is configured to store computer-executable instructions that, when executed by the processor, cause the computing device to perform the following: obtaining a video to be processed submitted by a user; performing semantic recognition on the video in one or more semantic recognition dimensions to obtain one or more video label data items corresponding to the video in the one or more semantic recognition dimensions; generating a target label combination based on an input of the user for the video label data; determining one or more video clips in the video corresponding to at least one video label in the target label combination; and generating at least one target video clip corresponding to the target label combination based on at least one of the one or more video clips.

In one embodiment, the disclosure provides a computing device, the computing device comprising: a memory and a processor; wherein the memory is configured to store computer-executable instructions that, when executed by the processor, cause the computing device to perform the following: obtaining a video to be processed; performing semantic recognition on the video in one or more semantic recognition dimensions to obtain one or more video label data items corresponding to the video in the one or more semantic recognition dimensions; generating at least one candidate label combination based on at least one of the one or more video label data items; delivering the at least one candidate label combination to a client corresponding to a user to which the video belongs; receiving a target label combination submitted by the client; determining one or more video clips in the video corresponding to at least one video label in the target label combination; generating at least one target video clip corresponding to the target label combination based on at least one of the one or more video clips; and delivering the at least one target video clip to the client.

In one embodiment, the disclosure provides a computing device, the computing device comprising: a memory and a processor; wherein the memory is configured to store computer-executable instructions that, when executed by the processor, cause the computing device to perform the following: receiving at least one candidate label combination delivered by a server; displaying the at least one candidate label combination to a user; receiving a target label combination submitted by the user based on the at least one candidate label combination; submitting the target label combination to the server; and receiving at least one target video clip corresponding to the target label combination returned by the server.

In one embodiment, the disclosure provides a computer-readable storage media for storing computer instructions that, when executed by a processor, implement the steps of the video processing methods as described in the disclosure.

According to various embodiments of the disclosure, with the method for video processing, semantic recognition is performed on a video from a video content provider in one or more semantic recognition dimensions, and from the perspective of a plurality of video label data items obtained via semantic recognition, and based on a selection by a user for candidate label combinations generated based on the video label data items, target video clips corresponding to the selection of the user are generated. This way, the video is recognized and understood more precisely and comprehensively, thereby improving the degree of precision and comprehensiveness in content representation in the target video clips, and at the same time, improving the video processing efficiency for the video content provider.

According to some embodiments of the disclosure, with the method for video processing, semantic recognition is performed on a video from a video providing user in a plurality of semantic recognition dimensions, and from the perspective of a plurality of video label data items obtained via semantic recognition, corresponding target video clips are generated based on the input from the user. This way, the video is recognized and understood more precisely and comprehensively, thereby improving the degree of precision and comprehensiveness in content representation in the target video clips, and at the same time, improving the video processing efficiency for the video providing user.

DETAILED DESCRIPTION OF THE EMBODIMENTS

The disclosure is described in detail below to facilitate full understanding thereof. However, the disclosure can be implemented in many other ways different from those described herein, and those skilled in the art can make similar modifications without departing from the spirit of the disclosure. Therefore, the disclosure is not limited by the specific implementations disclosed below.

The terms used in one or more embodiments of the disclosure are only used for illustrative purposes of describing specific embodiments and are not intended to be limiting. The singular forms "a," "said," and "the" used in one or more embodiments of the disclosure and in the appended claims are also intended to include plural forms, unless the context clearly indicates otherwise. It should also be understood that the term "and/or" used in one or more embodiments of the disclosure refers to and includes any or all possible combinations of one or more associated listed items.

It should be understood that although terms such as "first," "second," etc., may be used to describe various types of information in one or more embodiments of the disclosure, such information should not be limiting. These terms are only used to distinguish one type of information from another type of information. For example, without departing from the scope of one or more embodiments of the disclosure, the "first" may also be referred to as the "second," and similarly, the "second" may also be referred to as the "first," Depending on the context, the word "if" as used herein may be construed to mean "when . . . " or "upon . . . " or "in response to determining."

Figure 1:
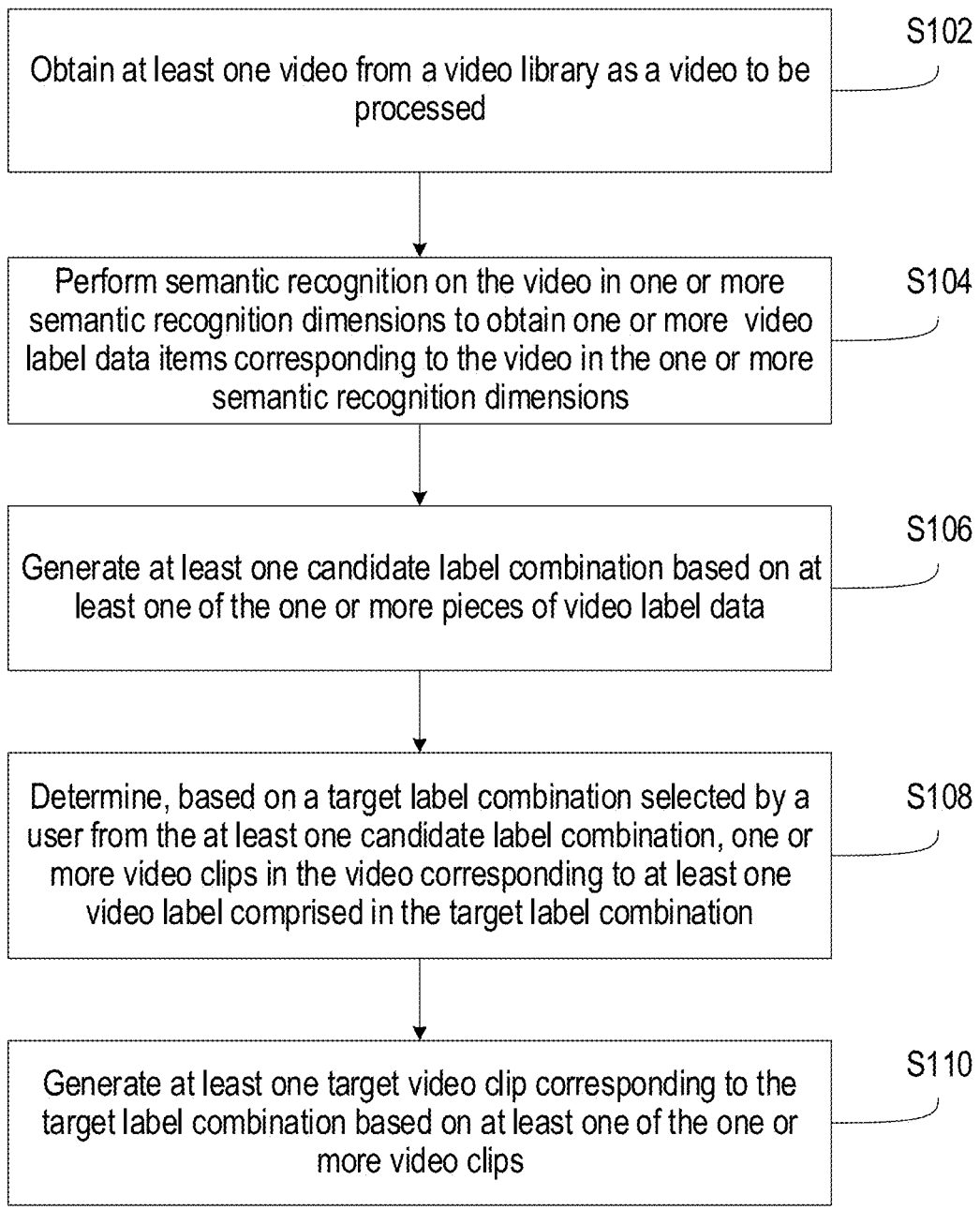
FIG. 1 is a flow diagram illustrating a method for video processing according to some embodiments of the disclosure.
Figure 2:
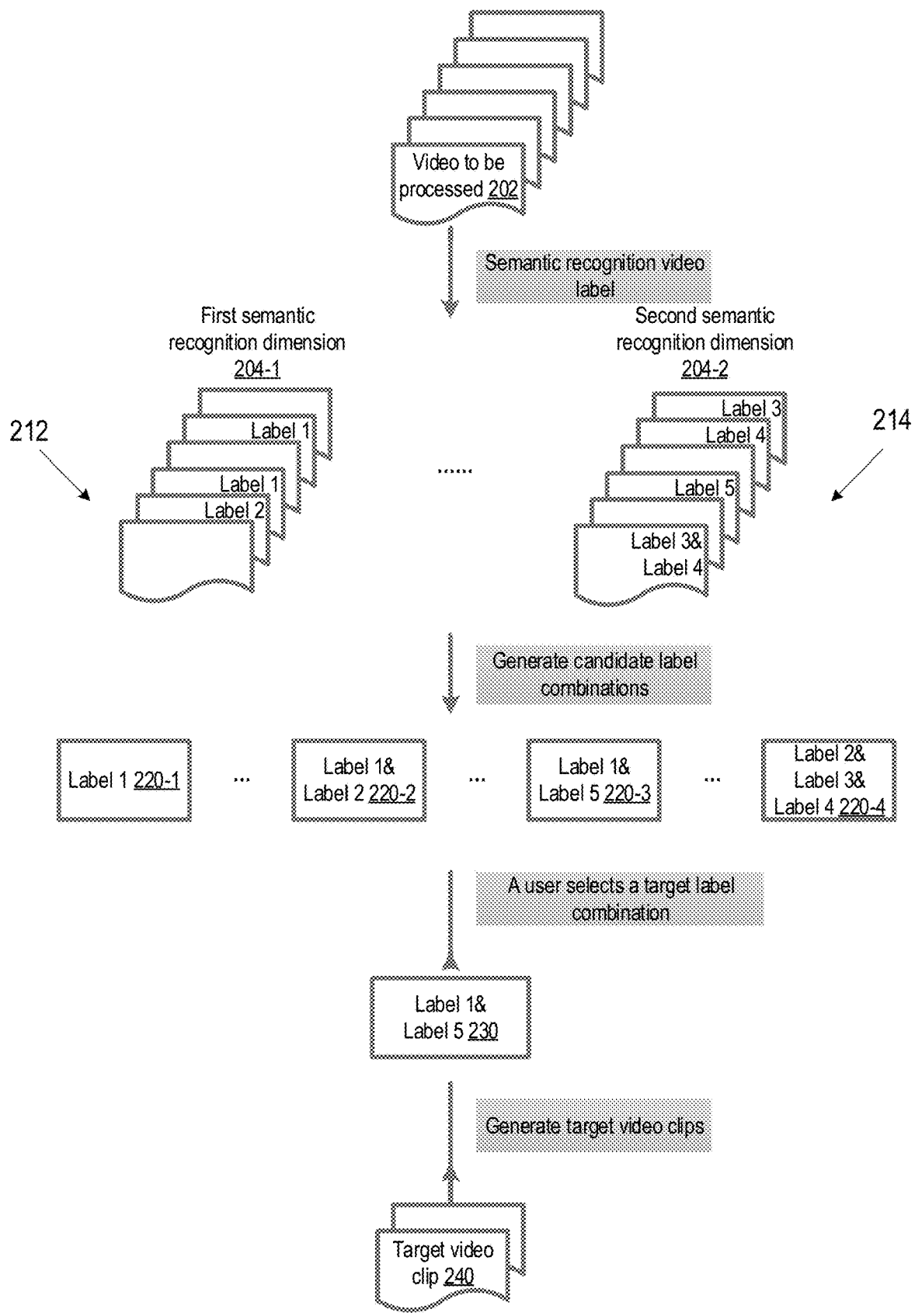
FIG. 2 is a schematic diagram illustrating a scenario for video processing according to some embodiments of the disclosure.
Figure 3:
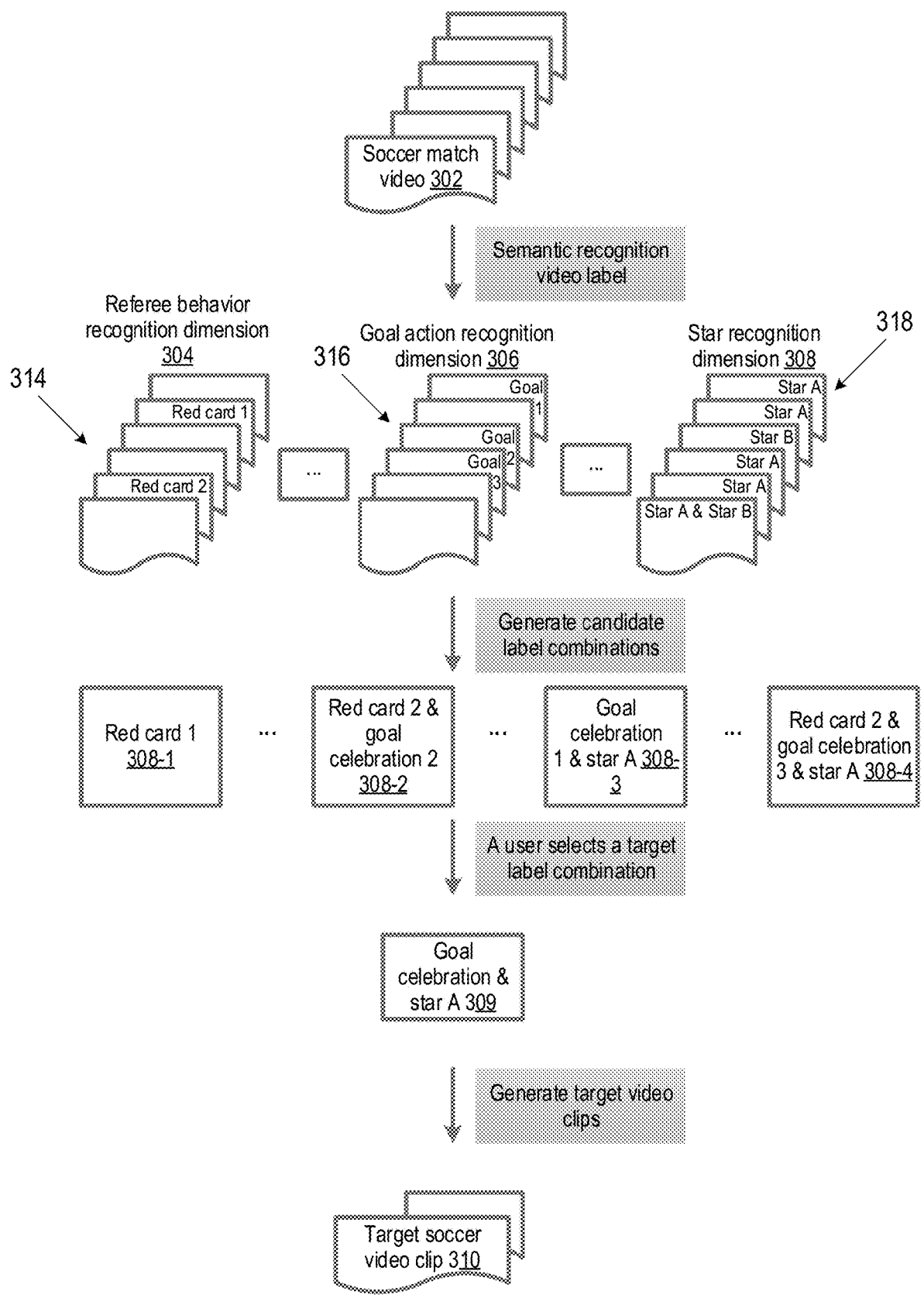
FIG. 3 is a schematic diagram illustrating a scenario for video processing according to some embodiments of the disclosure.
Figure 4:
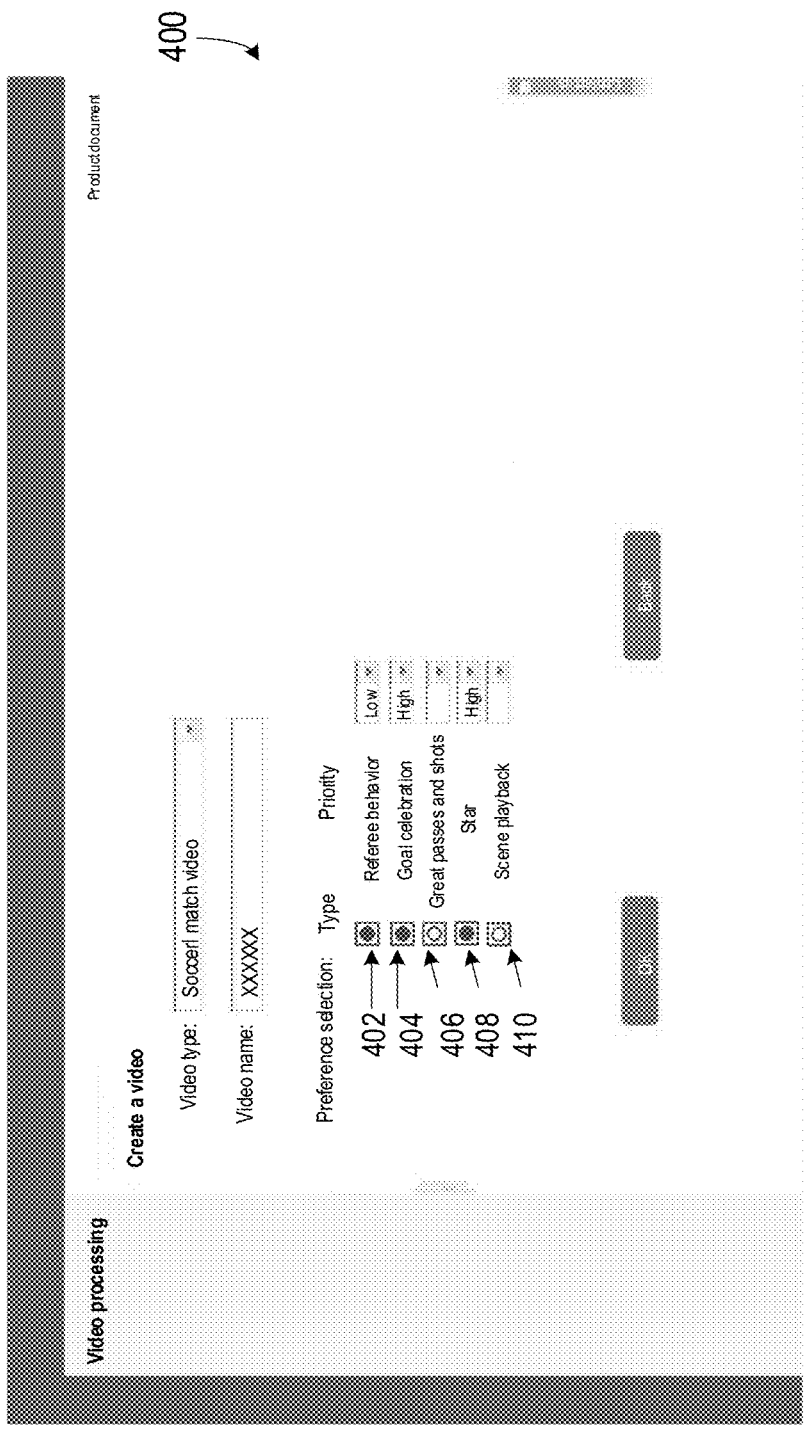
FIG. 4 is a schematic diagram illustrating a user interface for video processing according to some embodiments of the disclosure.

FIG. 1 is a flow diagram illustrating a method for video processing according to some embodiments of the disclosure. FIG. 2 is a schematic diagram illustrating a scenario for video processing according to some embodiments of the disclosure. FIG. 3 is a schematic diagram illustrating a scenario for video processing according to some embodiments of the disclosure. FIG. 4 is a schematic diagram illustrating a user interface for video processing according to some embodiments of the disclosure. The following illustrates the method of FIG. 1 with simultaneous reference to FIGS. 2-4. In some embodiments and as shown in FIG. 1, the method includes the following steps.

Step S102: obtain at least one video from a video repository as a video to be processed.

In some embodiments, in the process that a video platform or a video website provides video browsing and accessing to a viewing user, to enable the viewing user to obtain a more efficient and speedy video browsing experience, videos are edited to extract the key content therein and provided to the viewing user in the form of video highlights. For example, in the field of sports videos and current political news videos, the viewing user focuses more on the highlights in sports videos or the key content in current political news videos. From the perspective of the viewing user, it is preferred that more information or more valuable information is obtained within a limited time, without affecting the viewing experience by missing highlights in videos. On the other hand, from the perspective of a video content provider (e.g., a video website, a video platform, or a video producer), the key is how to extract the content from a video more accurately and comprehensively and use video highlight clips to present the video in a more comprehensive and precise manner, thereby attracting more viewing users.

Now referring to FIG. 2, semantic recognition is performed on video(s) (202) to be processed from a video content provider in a plurality of semantic recognition dimensions (204-1, 204-2, . . . ). From the perspective of a plurality of video label data items (212, 214, . . . ) obtained via semantic recognition, based on a selection (230) of a user for candidate label combinations (220-1, 220-2, 220-3, 220-4, . . . ) generated based on the video label data items (212, 214, . . . ), target video clips (240) corresponding to the selection (230) of the user are generated. This way, the video is recognized and understood more precisely and comprehensively, thereby improving the degree of precision and comprehensiveness in representing the content of the target video clips, and at the same time, improving the video processing efficiency for the video content provider.

In some embodiments, in addition to semantic recognition of the video to be processed in a plurality of semantic recognition dimensions, semantic recognition is also performed on the video in a single semantic recognition dimension. As such, corresponding target video clips are generated based on semantic recognition. In this embodiment illustrated herein, a plurality of semantic recognition dimensions are utilized for sematic recognition. Details of video processing based on a single semantic recognition dimension that are substantially similar to those described with regard to the video processing based on a plurality of semantic recognition dimensions are not repeated herein.

In implementations, in a scenario of video processing with regard to a video content provider, a user as used herein refers to video processing staff responsible for video management, or video maintenance (e.g., video editing staff associated with the video content provider). In some embodiments, to make it convenient for the video processing staff to upload the video to be processed, after the address information of the video repository uploaded by the user is received, videos in the video repository are imported based on the address information. Therefore, in the process of processing videos in the video library, at least one video in the video repository is obtained as the video to be processed based on the selection of the user.

Step S104: perform semantic recognition on the video in one or more semantic recognition dimensions to obtain one or more video label data items corresponding to the video in the one or more semantic recognition dimensions.

In some embodiments, to enhance the accuracy of semantic recognition on the video, semantic recognition is performed on the video in a specific semantic recognition dimension to obtain video label data of the video in the corresponding semantic recognition dimension. Based on this, to further enhance the comprehensiveness of semantic recognition on the video and improve the comprehensiveness in content representation for the video using the video label data items obtained via semantic recognition, semantic recognition at a plurality of semantic recognition dimensions is further performed on the video in the corresponding semantic recognition dimensions to obtain a plurality of corresponding video label data items. The video label data items record video labels of the semantic recognition dimensions and time periods in the video corresponding to the video labels.

Now referring to FIG. 3, in one example, video processing staff associated with a video website selects soccer match video(s) (302) from a video repository of the video website as video(s) to be processed. In processing the soccer match video (e.g., in generating highlight clips of the soccer match video), semantic recognition is performed on the soccer match video in three semantic recognition dimensions: a referee behavior recognition dimension (304), a goal recognition dimension (306), and a star recognition dimension (308). The recognition result is specified as the following.

(1) video label data items (314) corresponding to the referee behavior recognition dimension (304) include a red card label "Label a1" corresponding to a red card 1, and a playback time period in the soccer match video corresponding to the red card label "Label a1" is T_a1_start to T_a1_end; a red card label "Label a2" corresponding to a red card 2, and a playback time period in the soccer match video corresponding to the red card label "Label a2" is T_a2 start to T_a2_end.

(2) video label data items (316) corresponding to the goal action recognition dimension 306) includes: a goal celebration action label "Label 131" corresponding to a goal celebration 1, and a playback time period in the soccer match video corresponding to the goal celebration action label "Label 131" is T_b1_start to T_b1_end; a goal celebration action label "Label b2" corresponding to a goal celebration 2, and a playback time period in the soccer match video corresponding to the goal celebration action label "Label b2" is T_b2_start to T_b2_end; a goal celebration action label "Label b3" corresponding to a goal celebration 3, and a playback time period in the soccer match video corresponding to the goal celebration action label "Label b3" is T_b3_start to T_b3_end.

(3) video label data items (318) corresponding to the star recognition dimension (308) includes: a soccer star action label "Label c1" corresponding to a soccer star A, and playback time periods in the soccer match video corresponding to the soccer star action label "Label c1" are T_c1_start to T_c1_end, T_c2_start to T_c2_end, T_c3_start to T_c3_end, T_c4_start to T_c4_end, and T_c5_start to T_c5_end; a soccer star action label "Label c2" corresponding to a star B, and playback time periods in the soccer match video corresponding to the soccer star action label "Label c2" are T_c1_start to T_c1_end and T_c4_start to T_c4_end.

In implementations, in semantic recognition of the video in the one or more semantic recognition dimensions, semantic recognition models is used for implementation. In one example, the semantic recognition models are obtained by training at different semantic recognition dimensions, respectively. Videos are input to the semantic recognition model associated with each semantic recognition dimension obtained by training; and video label data items output by the semantic recognition model associated with each semantic recognition dimension is used as video label data items for the video in each semantic recognition dimension. Further, a semantic recognition model for semantic recognition in a plurality of semantic recognition dimensions is also be trained. In this case, videos are input to the semantic recognition model obtained by training, and the semantic recognition model performs semantic recognition on the video in the plurality of semantic recognition dimensions, respectively. Video label data items at the plurality of semantic recognition dimensions output by the semantic recognition model is used as video label data items for the video in the plurality of semantic recognition dimensions.

Step S106: generate at least one candidate label combination based on at least one of the one or more video label data items.

In implementations, if semantic recognition is performed on the video in a single semantic recognition dimension, based on video label data items obtained by performing semantic recognition on the video in the semantic recognition dimension, the candidate label combination is generated based on the obtained video label data items. If semantic recognition is performed on the video in a plurality of semantic recognition dimensions, based on generated video labels of the video in the plurality of semantic recognition dimensions, at least one candidate label combination is generated based on at least one of the video labels in the plurality of semantic recognition dimensions.

Still referring to FIG. 3, as shown in this example, the video label data items corresponding to the referee behavior recognition dimension (304) includes the red card label Label a1 and the red card label Label a2; the video label data items corresponding to the goal action recognition dimension (306) includes the goal celebration action label Label 131, the goal celebration action label Label b2; and the video label data corresponding to the star recognition dimension (308) includes the goal celebration action label Label b3 in and the star action label Label c1 and the star action label Label c2. As such, the combinations of the video label data items include the following.

Label a1-Label b1, Label a1-Label b2, Label a1-Label b3; Label a1-Label c1, Label a1-Label c2; Label a2-Label b1, Label a2-Label b2, Label a2-Label b3; Label a2-Label c1, Label a2-Label c2; Label b1-Label c1, Label b1-Label c2; Label b2-Label c1, Label b2-Label c2; Label b3-Label c1, Label b3-Label c2;

Label a1-Label b1-Label c1, Label a1-Label b1-Label c2, Label a1-Label b2-Label c1, Label a1-Label b2-Label c2, Label a1-Label b3-Label c1, Label a1-Label b3-Label c2; Label a2-Label b1-Label c1, Label a2-Label b1-Label c2, Label a2-Label b2-Label c1, Label a2-Label b2-Label c2, Label a2-Label b3-Label c1, Label a2-Label b3-Label c2;

Label a1-Label b1-Label c1-Label c2, Label a1-Label b2-Label c1-Label c2, Label a1-Label b3-Label c1-Label c2; Label a2-Label b1-Label c1-Label c2, Label a2-Label b2-Label c1-Label c2, Label a2-Label b3-Label c1-Label c2.

In some embodiments, when semantic recognition is performed on the video in a plurality of semantic recognition dimensions, for the playback time periods corresponding to generated video labels of the video in the plurality of semantic recognition dimensions, the playback time periods corresponding to some video labels coincide; while the playback time periods corresponding to other video labels do not coincide. For video labels corresponding to playback time periods not in coincidence, when these video labels are combined into a video label combination, a playback time segment determined in the video based on the video label combination is empty. Thus, in some embodiments, to improve the effectiveness of video processing, and at the same time prevent computing resources waste caused by useless video processing, the at least one candidate label combination is generated in the following manner.

First, extracting video labels in video label data corresponding to at least two semantic recognition dimensions in the plurality of semantic recognition dimensions, and corresponding playback time periods in the video, respectively. Next, determining whether the playback time periods corresponding to the video labels that correspond to the at least two semantic recognition dimensions coincide in time. If so, generating label combinations based on the video labels corresponding to the at least two semantic recognition dimensions as the candidate label combinations. Otherwise, performing no processing.

In implementations, in the case that the video is long or has complicated content, a large number of video label data items are recognized from the video at a plurality of semantic recognition dimensions. Accordingly, in the video label data items include a large number of video labels. In this case, in generating the candidate label combinations based on the video labels, a larger number of candidate label combinations are also generated. As such, it is difficult for the video processing staff of the video content provider, as the user, to make a quick selection when facing numerous candidate label combinations. In some embodiments, to reduce the selection difficulty for the video processing staff and improve the interactive experience of the video processing staff in video processing, the candidate label combinations are displayed in the following manner.

First, calculating a label combination score corresponding to each candidate label combination based on respective label weights and respective label scores of the video labels in the video label data items. Next, filtering the at least one candidate label combination to obtain candidate label combinations having label combination scores satisfying a preset score threshold range; and displaying the obtained candidate label combinations to the user in descending order of the label combination scores.

In some embodiments, the label weights of the video labels are preset or set by the video content provider based on service requirements. The video content provider may increase the label weights of the video labels in one or more semantic recognition dimensions or decrease the label weights of the video labels in one or more semantic recognition dimensions based on the collected video preferences of the user. As shown in the user interface of FIG. 4, in processing the soccer match video(s), the priority of the goal action recognition dimension (404) is raised to increase label weights of video labels in the goal action recognition dimension, the priority of the star recognition dimension (408) is raised to increase label weights of video labels in the star recognition dimension, and the priority of the referee behavior recognition dimension (402) is lowered to decrease label weights of video labels in the referee behavior recognition dimension. On the other hand, a scene playback recognition dimension (410) and a great pass and goal shooting recognition dimension (406) are not selected, resulting in no need to increase or decrease label weights of video labels in the two semantic recognition dimensions.

In some embodiments, the increase or decrease of a label weight of a video label is reflected in candidate label combinations displayed to the user. If the label weight of the video label is increased, a display priority of the candidate label combination including the video label corresponding to the label weight is accordingly raised; on the contrary, if the label weight of the video label is decreased, the display priority of the candidate label combination including the video label corresponding to the label weight is accordingly lowered.

In some embodiments, a label score of the video label is determined based on an occurrence frequency of the video label in the video, and the label score of the video label has a positive correlation with the occurrence frequency of the video label in the video. Further, in some embodiments, the label score is also set by the video content provider based on service requirements, without limitation.

Now referring back to FIG. 1, at step S108: determine, based on a target label combination selected by the user from the at least one candidate label combination, one or more video clips in the video corresponding to at least one video label in the target label combination.

In some embodiments, based on the at least one candidate label combination generated in the aforementioned step, here, based on a target label combination selected by the user from the at least one candidate label combination, one or more video clips in the video corresponding to at least one video label in the target label combination are determined, making preparation for the subsequent generation of the target video clips.

In some embodiments, for a video clip in the video corresponding to the video label, a start frame of the video clip is an image frame in the video corresponding to a start time point of the playback time period; and an end frame thereof is an image frame in the video corresponding to an end time point of the playback time period. As such, the video clip is a video clip formed by an image frame sequence between the start frame and the end frame in the video.

Still using the above example of the scenario of processing the soccer match video(s) of FIG. 3, the target label combination selected by the video processing staff of the video website from the candidate label combinations (308-1, 308-2, 308-3, 308-4, . . . ) is Label b2-Label c1 (309), that is, video labels corresponding to the goal celebration actions of the star A are selected as the target label combination.

Here, the video clip in the soccer match video corresponding to the goal celebration action label Label b2 is: a video clip formed by an image frame sequence between a start image frame corresponding to T_b2_start and an end image frame corresponding to T_b2_end in the soccer match video.

Here, the star action label Label c1 corresponding to the star A corresponds to five video clips in the soccer match video, which are: a video clip formed by an image frame sequence between a start image frame corresponding to T_c1_start and an end image frame corresponding to T_c1_end in the soccer match video, a video clip formed by an image frame sequence between a start image frame corresponding to T_c2_start and an end image frame corresponding to T_c2_end in the soccer match video, a video clip formed by an image frame sequence between a start image frame corresponding to T_c3_start and an end image frame corresponding to T_c3_end in the soccer match video, a video clip formed by an image frame sequence between a start image frame corresponding to T_c4_start and an end image frame corresponding to T_c4_end in the soccer match video, and a video clip formed by an image frame sequence between a start image frame corresponding to T_c5_start and an end image frame corresponding to T_c5_end in the soccer match video, respectively.

Step S110: generate at least one target video clip corresponding to the target label combination based on at least one of the one or more video clips.

In implementations, at least one target video clip corresponding to the target label combination is generated by the following steps of: extracting one or more frame sequences corresponding to the one or more video clips from the video based on one or more playback time periods corresponding to the one or more video clips; and generating the target video clip based on the one or more frame sequences based on a time sequence of playback time periods corresponding to the extracted one or more frame sequences.

Still using the aforementioned example of processing soccer match video(s), the user selects a target label combination Label b2-Label c1, two video labels in the target label combination Label b2-Label c1 correspond to a total of six video clips in the soccer match video, and six playback time periods in the soccer match video. Only T_b2_start to T_b2_end and T_c2_start to T_c2_end are the same playback time period in the six playback time periods. As such, only one video clip in the soccer match video satisfies the target label combination formed by the video labels that correspond to the goal celebration actions of the star A, namely, a video clip (310) corresponding to the playback time period T_b2_start to T_b2_end (T_c2_start to T_c2_end). Accordingly, the video clip is extracted from the soccer match video as the target video clip (video highlight clip).

In some embodiments, the target video clip is generated from video clips satisfying all video labels in the target label combination. However, in implementations, in the case that the target label combination selected by the user includes a large number of video labels, the finally generated target video clip may be short, or the video may even not have any target video clip satisfying all video labels in the target label combination. To avoid this situation and improve the user satisfaction with the generated target video clip, in some embodiments, at least one target video clip corresponding to the target label combination is generated by the following manner steps of: determining whether a plurality of playback time periods corresponding to the plurality of video clips coincide in time; if so, performing deduplication (e.g., remove duplicated playback time periods) on the plurality of playback time periods to obtain at least one deduplicated playback time period; extracting at least one frame sequence in the video corresponding to the at least one deduplicated playback time period; and combining the at least one frame sequence into the target video clip based on a time sequence of the at least one deduplicated playback time period; if not, extracting a plurality of time frame sequences corresponding to the plurality of playback time periods in the video; and combining the plurality of frame sequences into the target video clip based on a time sequence of the plurality of time frame sequences.

In some embodiments, implementations similar to the above-described two ways of generating the target video clip can be used to generate the target video clip, without limitation. As such, to further improve the satisfaction of the video content provider with the generated target video clip, in generating the target video clip, a plurality of different target video clips are generated using multiple implementations respectively and output to the video content provider. In some embodiments, the target videos are scored and ranked, and then output to the video content provider, to improve the experience of the video content provider.

In some embodiments, the target video clips are scored, ranked, and output by the following steps of: when a plurality of target video clips is generated, determining video labels in the target label combination corresponding to each target video clip, respectively; calculating a video clip score of each target video clip based on label weights and label scores of the determined video labels, respectively; filtering the plurality of target video clips to obtain target video clips having video clip scores satisfying a preset clip score threshold range; and outputting the obtained target video clips to the user in descending order of the video clip scores.

The following illustrates the video processing method with an application scenario of a court trial video as an example. In some embodiments, the video processing method applied to court trial videos includes the following steps.

(1) Generally, trial records of the court are recorded by video recording and stored in a trial video database. When it is needed to make an abstract of a trial record video of a particular trial, the trial record video of the trial is obtained from the trial video database for abstracting.

(2) Semantic recognition is performed on the trial record video in a judgment semantic recognition dimension and a lawyer argument semantic recognition dimension, respectively, to obtain judgment labels of video clips in the trial record video in the judgment semantic recognition dimension, and argument labels of video clips in the trial record video in the lawyer argument semantic recognition dimension.

(3) A plurality of candidate label combinations are generated based on the judgment labels of the video clips in the trial record video, and the argument labels of the video clips in the trial record video.

(4) A clerk or other staff of the court selects one or more candidate label combinations from the plurality of candidate label combinations based on requirements, and the selected one or more candidate label combinations are used as target label combinations. Video clips in the trial record video corresponding to judgment labels and/or argument labels in the target label combinations are further determined.

(5) A plurality of video abstract clips representing the abstract of the trial record video are generated based on the video clips in the trial record video corresponding to the judgment labels and/or argument labels.

The following illustrates the video processing method with an application scenario of a conference video processing as an example. In some embodiments, the video processing method applied to a conference video processing includes the following steps.

(1) As video conferences have been used more and more frequently, the content of video conferences often needs to be reviewed and analyzed. When a conference video of a particular conference needs to be abstracted or analyzed, the conference video of the conference is obtained from a conference video database for reviewing.

(2) Semantic recognition is performed on the conference video in a speech semantic recognition dimension, and a participant discussion semantic recognition dimension, respectively, to obtain speech labels of video clips in the conference video in the speech semantic recognition dimension, and participant discussion labels of video clips in the conference video in the participant discussion semantic recognition dimension.

(3) A plurality of candidate label combinations are generated based on the speech labels of the video clips in the conference video, and the participant discussion labels of the video clips in the conference video.

(4) A recorder or other staff of the conference selects one or more candidate label combinations from the plurality of candidate label combinations based on requirements, and the selected one or more candidate label combinations are used as target label combinations. Video clips in the conference video corresponding to speech labels and/or participant discussion labels in the target label combinations are further determined.

(5) A plurality of content abstract clips are generated based on the video clips in the conference video corresponding to the speech labels and/or participant discussion labels, and subsequently, content review is performed on the conference video more quickly and efficiently based on the generated content abstract clips.

The following illustrates the video processing method with an application scenario of a live streaming video processing as an example. In some embodiments, the video processing method applied to a live streaming video processing includes the following steps.

(1) As video live-streaming has been adopted more and more widely, the video live-streaming process is often accompanied by bullet subtitles. In analyzing a live video, analytical process is performed on the content of the live video itself, and in combination with bullet subtitle content of the live video. In some embodiments, in analyzing the live streaming video, a live streaming video recorded for a particular live streaming is obtained from a video database for analyzing.

(2) Semantic recognition is performed on the live streaming video in a video content semantic recognition dimension, and a bullet subtitle semantic recognition dimension, respectively, to obtain content labels of video clips in the live streaming video in the video content semantic recognition dimension, and bullet subtitle labels of video clips in the live streaming video in the bullet subtitle semantic recognition dimension.

(3) A plurality of candidate label combinations are generated based on the content labels of the video clips in the live streaming video and the bullet subtitle labels of the video clips in the live video.

(4) Content maintenance staff of the live streaming video selects one or more candidate label combinations from the plurality of candidate label combinations based on requirements, and the selected one or more candidate label combinations are used as target label combinations. Video clips in the live streaming video corresponding to content labels and/or bullet subtitle labels in the target label combinations are further determined.

(5) A plurality of live streaming video highlight clips are generated based on the video clips in the live streaming video corresponding to the content labels and/or bullet subtitle labels.

The following illustrates the video processing method with an application scenario of a movie/TV video processing as an example. In some embodiments, the video processing method applied to a movie/TV video processing includes the following steps.

(1) An episode video of a movie or TV series is obtained from a movie and TV video repository of a video website for processing.

(2) Semantic recognition is performed on the episode video in a character semantic recognition dimension, an action semantic recognition dimension, and an object semantic recognition dimension, respectively, to obtain character labels of video clips in the episode video in the character semantic recognition dimension, action labels of video clips in the episode video in the action semantic recognition dimension, and object labels of video clips in the episode video in the object semantic recognition dimension.

(3) A plurality of candidate label combinations are generated based on the character labels of the video clips in the episode video, the action labels of the video clips in the episode video, and the object labels of the video clips in the episode video.

(4) Content maintenance staff of the video website selects one or more candidate label combinations from the plurality of candidate label combinations based on requirements, and the selected one or more candidate label combinations are used as target label combinations. Video clips in the episode video corresponding to character labels, action labels, and/or object labels in the target label combinations are further determined.

In some embodiments, a viewing user of the movie or TV series not only focuses on the content of the movie or TV series itself, but also oftentimes on costumes of characters and props in the movie or TV series. As such, while object labels in the episode video are recognized, objects in the episode video corresponding to the object labels are determined. Accordingly, purchase links associated with the objects are obtained from a transaction platform, and a correspondence between the objects to which the object labels belong and the purchase links is established. Since the correspondence is established, when the viewing user views the episode video, if the user wants to purchase a particular object appearing in the episode video, the user can click on a corresponding purchase link to navigate to a corresponding purchase page.

(5) A plurality of highlight clips are generated based on the video clips in the episode video corresponding to the character labels, action labels, and/or object labels.

Accordingly, when the viewing user browses the highlight clips, a purchase link of an object to which an object label in the highlight clips is triggered, a purchase page of the triggered object is navigated to.

According to various embodiments of the disclosure, with the video processing method, semantic recognition is performed on a video to be processed from a video content provider in a plurality of semantic recognition dimensions, and from the perspective of a plurality of video label data items obtained via semantic recognition, and based on a selection of a user for candidate label combinations generated based on the video label data, items target video clips corresponding to the selection of the user are generated. This way, the video is recognized and understood more precisely and comprehensively, thereby improving the degree of precision and comprehensiveness in content representation of the target video clips, and at the same time improving the video processing efficiency for the video content provider.

Figure 5:
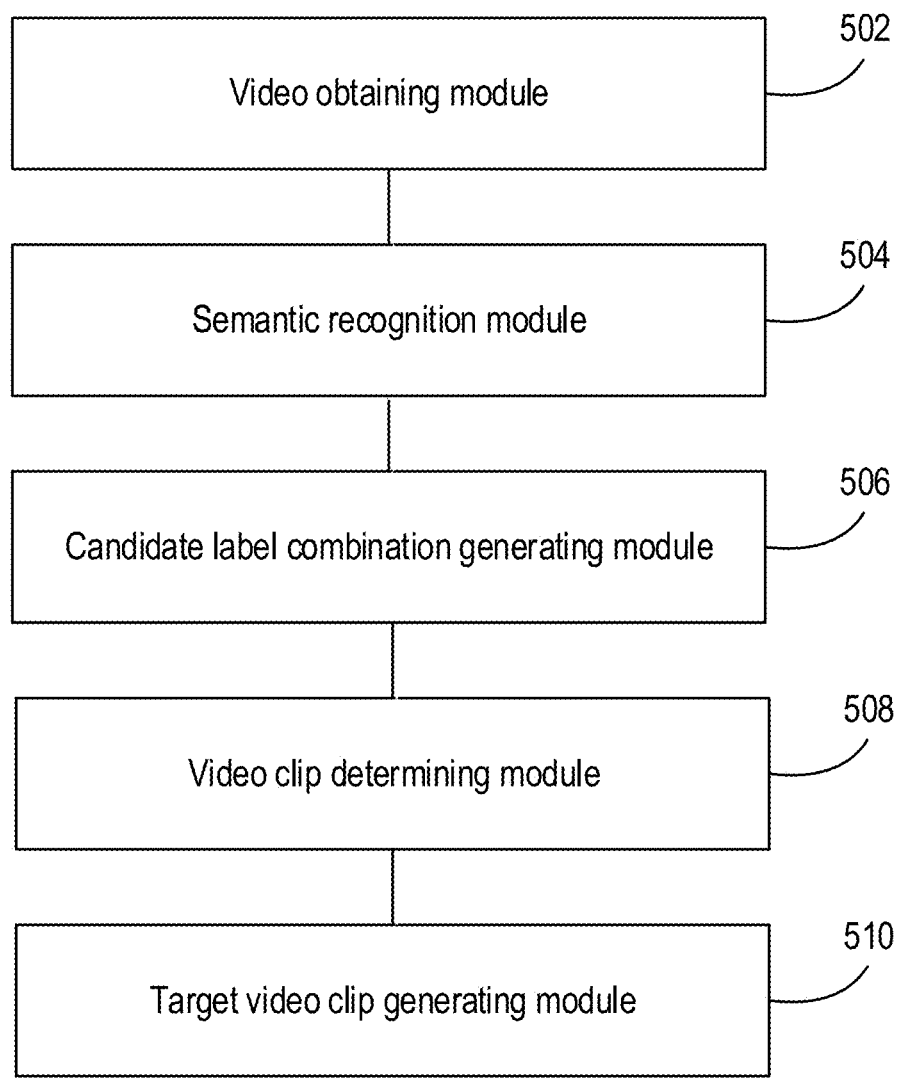
FIG. 5 is a block diagram illustrating an apparatus for video processing according to some embodiments of the disclosure.

FIG. 5 is a block diagram illustrating an apparatus for video processing apparatus according to some embodiments of the disclosure. Details of the apparatus that are substantially similar to those above-described embodiments are not repeated herein. In some embodiments and as shown herein, the apparatus includes: a video obtaining module (502), a semantic recognition module (504), a candidate label combination generating module (506), and a video clip determining module 508, a target video clip generating module (510).

The video obtaining module (502) is configured to obtain at least one video from a video repository as a video to be processed.

The semantic recognition module (504) is configured to perform semantic recognition on the video in one or more semantic recognition dimensions to obtain one or more video label data items corresponding to the video in the one or more semantic recognition dimensions.

The candidate label combination generating module (506) is configured to generate at least one candidate label combination based on at least one of the one or more video label data items.

The video clip determining module (508) is configured to determine, based on a target label combination selected by a user from the at least one candidate label combination, one or more video clips in the video corresponding to at least one video label in the target label combination.

The target video clip generating module (510) is configured to generate at least one target video clip corresponding to the target label combination based on at least one of the one or more video clips.

In some embodiments, the video label data items record video labels of the semantic recognition dimensions and playback time periods in the video corresponding to the video labels.

In some embodiments, the candidate label combination generating module (506) includes: an extraction sub-module configured to extract video labels in video label data corresponding to at least two semantic recognition dimensions in the plurality of semantic recognition dimensions and corresponding playback time periods in the video, respectively; a determination sub-module, configured to determine whether the playback time periods corresponding to the video labels that correspond to the at least two semantic recognition dimensions coincide in time; if so, execute a generation sub-module, which is configured to generate label combinations based on the video labels corresponding to the at least two semantic recognition dimensions as the candidate label combinations.

In some embodiments, the video processing apparatus further includes: a label combination score calculation module configured to calculate a label combination score corresponding to each candidate label combination based on label weights and label scores of the video labels in the video label data, respectively; a candidate label combination filtering module configured to filter the at least one candidate label combination to obtain candidate label combinations having label combination scores satisfying a preset score threshold range; and a candidate label combination display module configured to display the obtained candidate label combinations to the user in descending display order of the label combination scores.

In some embodiments, for one or more video clips in the video corresponding to the video labels, a start frame of the video clip is an image frame in the video corresponding to a start time point of the playback time period, and an end frame thereof is an image frame in the video corresponding to an end time point of the playback time period.

In some embodiments, the target video clip generating module (510) includes: a frame sequence extraction sub-module configured to extract one or more frame sequences corresponding to the one or more video clips from the video based on one or more playback time periods corresponding to the one or more video clips; and a target video clip generating sub-module configured to generate the target video clip based on the one or more frame sequences based on a time sequence of playback time periods corresponding to the extracted one or more frame sequences.

In some embodiments, the target video clip generating module (510) includes: a playback time period determination sub-module configured to determine whether a plurality of playback time periods corresponding to the plurality of video clips coincide in time; and if so, execute a playback time period deduplication sub-module, a frame sequence extraction sub-module, and a frame sequence combining sub-module, where the playback time period deduplication sub-module is configured to perform time deduplication (e.g., removing duplicates) on the plurality of playback time periods to obtain at least one deduplicated playback time period, the frame sequence extraction sub-module is configured to extract at least one frame sequence in the video corresponding to the at least one deduplicated playback time period, and the frame sequence combining sub-module is configured to combine the at least one frame sequence into the target video clip based on a time sequence of the at least one deduplicated playback time period.

In some embodiments, the video processing apparatus includes: a video label determining module configured to, if a plurality of target video clips is generated, determine video labels in the target label combination corresponding to each target video clip, respectively; a video clip score calculation module configured to calculate a video clip score of each target video clip based on label weights and label scores of the determined video labels, respectively; a target video clip filtering module configured to filter the plurality of target video clips to obtain target video clips having video clip scores satisfying a preset clip score threshold range; and a target video clip output module configured to output the obtained target video clips to the user in descending order of the video clip scores.

In some embodiments, the video processing apparatus includes: an address information receiving module configured to receive address information of the video repository that is uploaded by the user; and a video importing module configured to import videos in the video repository based on the address information.

Figure 6:
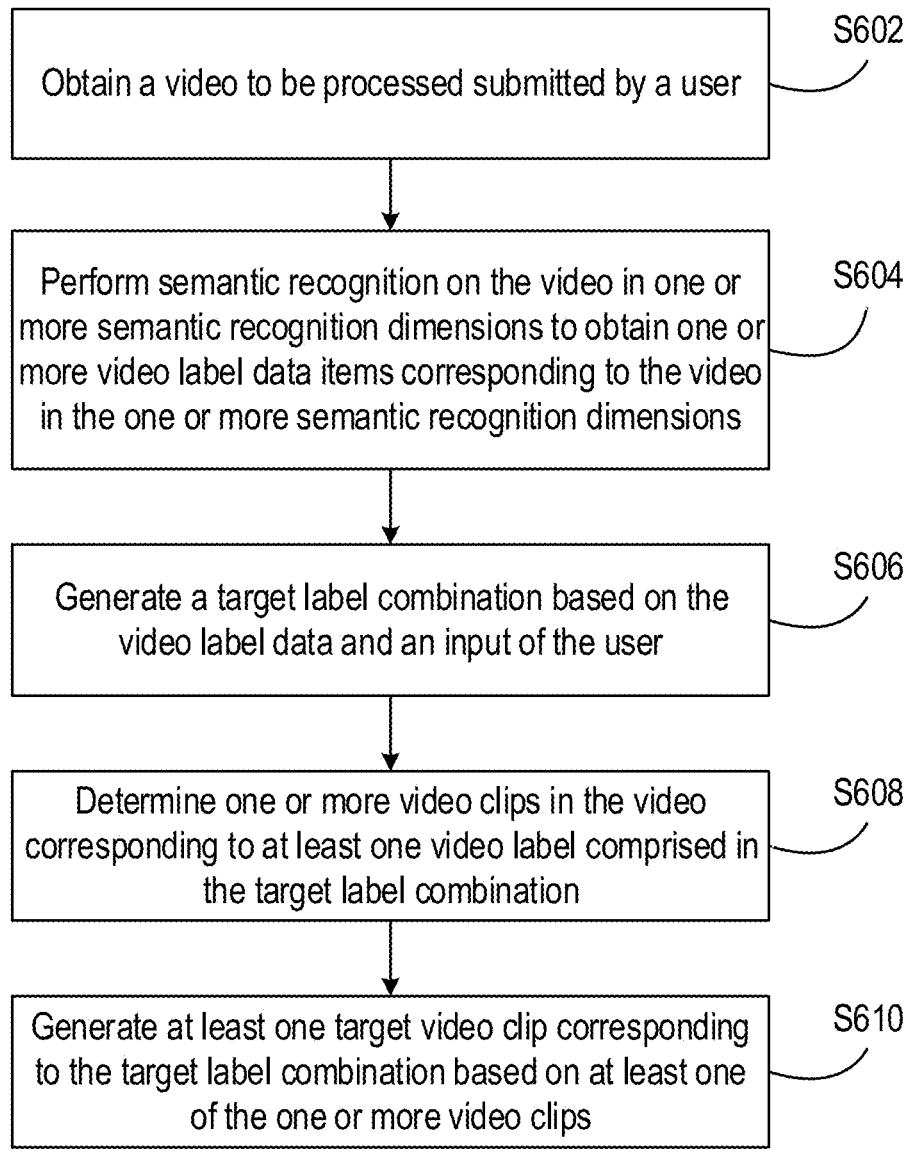
FIG. 6 is a flow diagram illustrating a method for video processing method according to some embodiments of the disclosure.

FIG. 6 is a flow diagram illustrating a method for video processing according to some embodiments. The following illustrated the method of FIG. 6 with simultaneous references to FIGS. 2-4. In some embodiments and as shown herein, the method includes the following steps.

Step S602: obtain a video to be processed submitted by a user.

In some embodiments, a personal user providing a video (a video providing user) provides videos for browsing and accessing to a viewing user via a video platform or a video website. To enable the viewing user to obtain a more efficient and quick video browsing experience, a video is edited to extract the key content in the video and provide it to the viewing user in the form of video highlights. For example, in the field of sports videos and current political news videos, the viewing user focuses more on the highlights in sports videos or the key content in current political news videos. From the perspective of the viewing user, it is preferred that more information or more valuable information is obtained within a limited time, without affecting the viewing experience by missing highlights in videos. On the other hand, from the perspective of the video providing user, the key is how to extract the content from a video more accurately and comprehensively, and use video highlight clips to present the video in a more comprehensive and precise manner, thereby attracting more viewing users.

As shown in FIG. 2, semantic recognition is performed on a video to be processed from a video content provider in a plurality of semantic recognition dimensions. From the perspective of a plurality of video label data items obtained via semantic recognition, based on a selection of a user for candidate label combinations generated based on the video label data items, target video clips corresponding to the selection of the user are generated. This way, the video is recognized and understood more precisely and comprehensively, thereby improving the degree of precision and comprehensiveness in representing the content of the target video clips, and at the same time improving the video processing efficiency for the video content provider.

In some embodiments, in addition to semantic recognition of the video to be processed in a plurality of semantic recognition dimensions, semantic recognition is also performed on the video in a single semantic recognition dimension. As such, corresponding target video clips are generated based on semantic recognition. In this embodiment illustrated herein, a plurality of semantic recognition dimensions are utilized for sematic recognition. Details of video processing based on a single semantic recognition dimension that are substantially similar to those described with regard to the video processing based on a plurality of semantic recognition dimensions are not repeated herein.

In implementations, in a scenario of video processing with regard to a video content user, based on the video uploaded by the video content user, the video uploaded by the video content user is used as a video to be processed.

Step S604: perform semantic recognition on the video in one or more semantic recognition dimensions to obtain one or more video label data items corresponding to the video in the one or more semantic recognition dimensions.

In some embodiments, to enhance the accuracy of semantic recognition on the video, semantic recognition is performed on the video in a specific semantic recognition dimension to obtain video label data of the video in the corresponding semantic recognition dimension. Based on this, to further enhance the comprehensiveness of semantic recognition on the video, and improve the comprehensiveness in content representation for the video using the video label data items obtained via semantic recognition, semantic recognition at a plurality of semantic recognition dimensions is further performed on the video in the corresponding semantic recognition dimensions to obtain a plurality of corresponding video label data items. The video label data items record video labels of the semantic recognition dimensions, and playback time periods in the video corresponding to the video labels.

For example, the video providing user uploads a soccer match video as the video to be processed. In processing the soccer match video (e.g., in generating the highlight clips for the soccer match video), as shown in FIG. 3, semantic recognition is performed on the soccer match video in three semantic recognition dimensions including: a referee behavior recognition dimension (304), a goal recognition dimension (306), and a star recognition dimension (308). The recognition result is specified as the following.

(1) video label data items (314) corresponding to the referee behavior recognition dimension (304) include: a red card label "Label a1" corresponding to a red card 1, and a playback time period in the soccer match video corresponding to the red card label "Label a1" is T_a1_start to T_a1_end; a red card label "Label a2" corresponding to a red card 2, and a playback time period in the soccer match video corresponding to the red card label "Label a2" is T_a2 start to T_a2_end.

(2) video label data items (316) corresponding to the goal action recognition dimension 306) includes: a goal celebration action label "Label 131" corresponding to a goal celebration 1, and a playback time period in the soccer match video corresponding to the goal celebration action label "Label 131" is T_b1_start to T_b1_end; a goal celebration action label "Label b2" corresponding to a goal celebration 2, and a playback time period in the soccer match video corresponding to the goal celebration action label "Label b2" is T_b2_start to T_b2_end; a goal celebration action label "Label b3" corresponding to a goal celebration 3, and a playback time period in the soccer match video corresponding to the goal celebration action label "Label b3" is T_b3_start to T_b3_end.

(3) video label data items (318) corresponding to the star recognition dimension (308) includes: a soccer star action label "Label c1" corresponding to a soccer star A, and playback time periods in the soccer match video corresponding to the soccer star action label "Label c1" are T_c1_start to T_c1_end, T_c2_start to T_c2_end, T_c3_start to T_c3_end, T_c4_start to T_c4_end, and T_c5_start to T_c5_end; a soccer star action label "Label c2" corresponding to a star B, and playback time periods in the soccer match video corresponding to the soccer star action label "Label c2" are T_c1_start to T_c1_end and T_c4_start to T_c4_end.

In implementations, in semantic recognition of the video in the one or more semantic recognition dimensions, semantic recognition models is used for implementation. In one example, the semantic recognition models are obtained by training at different semantic recognition dimensions, respectively. Videos are input to the semantic recognition model associated with each semantic recognition dimension obtained by training; and video label data items output by the semantic recognition model associated with each semantic recognition dimension is used as video label data items for the video in each semantic recognition dimension. Further, a semantic recognition model for semantic recognition in a plurality of semantic recognition dimensions is also be trained. In this case, videos are input to the semantic recognition model obtained by training, and the semantic recognition model performs semantic recognition on the video in the plurality of semantic recognition dimensions, respectively. Video label data items at the plurality of semantic recognition dimensions output by the semantic recognition model is used as video label data items for the video in the plurality of semantic recognition dimensions.

Step S606: generate a target label combination based on the video label data and an input of the user.

In some embodiments, in processing videos for a video providing user, to improve the video processing experience of the video providing user, based on the generated video label data items, a video processing interface is launched for the video providing user. As such, a channel for participating in video processing and editing is provided to the video providing user via the video processing interface. In some embodiments, the target label combination is generated by the following steps of: obtaining video search keywords input by the user; determining one or more video labels in the one or more video label data items corresponding to the video search keywords; and generating the at least one target label combination based on the one or more video labels corresponding to the video search keywords.

In some embodiments, when the video providing user inputs search keywords at the video processing interface, video processing preferences are further provided at the video processing interface. As shown in the exemplary user interface 400 of FIG. 4, in processing the soccer match video(s), the priority of the goal action recognition dimension (404) is raised to increase label weights of video labels in the goal action recognition dimension, the priority of the star recognition dimension (408) is raised to increase label weights of video labels in the star recognition dimension, and the priority of the referee behavior recognition dimension (402) is lowered to decrease label weights of video labels in the referee behavior recognition dimension. On the other hand, a scene playback recognition dimension (410) and a great pass and goal shooting recognition dimension (406) are not selected, resulting in no need to increase or decrease label weights of video labels in the two semantic recognition dimensions.

In some embodiments, the increase or decrease of a label weight of a video label is reflected in candidate label combinations displayed to the user. If the label weight of the video label is increased, a display priority of the candidate label combination including the video label corresponding to the label weight is accordingly raised. On the contrary, if the label weight of the video label is decreased, the display priority of the candidate label combination including the video label corresponding to the label weight is accordingly lowered.

Step S608: determine one or more video clips in the video corresponding to at least one video label in the target label combination.

In some embodiments, based on the target label combination generated in the aforementioned step, here, based on the generated target label combination, one or more video clips in the video corresponding to at least one video label in the target label combination are determined, making preparation for the subsequent generation of the target video clips.

In some embodiments, for a video clip in the video corresponding to the video label, a start frame of the video clip is an image frame in the video corresponding to a start time point of the playback time period; and an end frame thereof is an image frame in the video corresponding to an end time point of the playback time period. As such, the video clip is a video clip formed by an image frame sequence between the start frame and the end frame in the video.

Still using the above example of the scenario of processing the soccer match video(s), the video search keywords output by the video providing user of the soccer match video are "star" and "goal." As such, it is determined that a video label corresponding to the video search keyword "star" is the star action label Label c1 corresponding to the star A, and a video label corresponding to the video search keyword "goal" is the goal celebration action label Label b2. Accordingly, a target label combination generated is Label b2-Label c1, that is, video labels corresponding to the goal celebration actions of the star A are selected as the target label combination.

Here, the video clip in the soccer match video corresponding to the goal celebration action label Label b2 is: a video clip formed by an image frame sequence between a start image frame corresponding to T_b2_start and an end image frame corresponding to T_b2_end in the soccer match video.

Here, the star action label Label c1 corresponding to the star A corresponds to five video clips in the soccer match video, which are: a video clip formed by an image frame sequence between a start image frame corresponding to T_c1_start and an end image frame corresponding to T_c1_end in the soccer match video, a video clip formed by an image frame sequence between a start image frame corresponding to T_c2_start and an end image frame corresponding to T_c2_end in the soccer match video, a video clip formed by an image frame sequence between a start image frame corresponding to T_c3_start and an end image frame corresponding to T_c3_end in the soccer match video, a video clip formed by an image frame sequence between a start image frame corresponding to T_c4_start and an end image frame corresponding to T_c4_end in the soccer match video, and a video clip formed by an image frame sequence between a start image frame corresponding to T_c5_start and an end image frame corresponding to T_c5_end in the soccer match video, respectively.

Step S610: generate at least one target video clip corresponding to the target label combination based on at least one of the one or more video clips.

In implementations, at least one target video clip corresponding to the target label combination is generated by the following steps of: extracting one or more frame sequences corresponding to the one or more video clips from the video based on one or more playback time periods corresponding to the one or more video clips; and generating the target video clip based on the one or more frame sequences based on a time sequence of playback time periods corresponding to the extracted one or more frame sequences.

Still using the aforementioned example of processing soccer match video(s), the user selects a target label combination Label b2-Label c1, two video labels in the target label combination Label b2-Label c1 correspond to a total of six video clips in the soccer match video, and six playback time periods in the soccer match video. Only T_b2_start to T_b2_end and T_c2_start to T_c2_end are the same playback time period in the six playback time periods. As such, only one video clip in the soccer match video satisfies the target label combination formed by the video labels that correspond to the goal celebration actions of the star A, namely, a video clip corresponding to the playback time period T_b2_start to T_b2_end (T_c2_start to T_c2_end). Accordingly, the video clip is extracted from the soccer match video as the target video clip (video highlight clip).

In some embodiments, the target video clip is generated from video clips satisfying all video labels in the target label combination. However, in implementations, in the case that video labels in the target label combination selected by the user correspond to scattered playback time periods, the generated target video clip has poor content continuity (e.g., has many time segments of 5s long or even shorter), resulting in a poor experiences for the viewing user in viewing. To avoid this situation and improve the user satisfaction with the generated target video clip, in some embodiments, at least one target video clip corresponding to the target label combination is generated by the following steps of: determining whether a plurality of playback time periods corresponding to the plurality of video clips are consecutive in time; if so, merging the plurality of playback time periods that are consecutive in time into at least one continuous playback time period; extracting at least one frame sequence in the video corresponding to the at least one continuous playback time period; and generating the target video clip based on the at least one frame sequence and a time sequence of the at least one frame sequence; and if not, performing no processing.

In some embodiments, implementations similar to the above-described two ways of generating the target video clip can be used to generate the target video clip, without limitation. As such, to further improve the satisfaction of the video providing user with the generated target video clip, in generating the target video clip, a plurality of different target video clips are generated using multiple implementations respectively and output to the video providing user. In some embodiments, the target videos are scored and ranked, and then output to the video providing user, to improve the experience of the video providing user.

In some embodiments, the ranking and scoring of the target video clips includes the steps of: when a plurality of target video clips is generated, determining video labels in the target label combination corresponding to each target video clip, respectively; calculating a video clip score of each target video clip based on label weights and label scores of the determined video labels, respectively; filtering the plurality of target video clips to obtain target video clips having video clip scores satisfying a preset clip score threshold range; and outputting the obtained target video clips to the user in descending order of the video clip scores.

In some embodiments, the label weights of the video labels are preset or set by the video providing user based on service requirements. The video providing user may increase the label weights of the video labels in one or more semantic recognition dimensions, or decrease the label weights of the video labels in one or more semantic recognition dimensions based on the collected video preferences of the user.

In some embodiments, a label score of the video label is determined based on an occurrence frequency of the video label in the video, and the label score of the video label has a positive correlation with the occurrence frequency of the video label in the video. Further, in some embodiments, the label score is also set by the video providing user based on service requirements, without limitation.

According to various embodiments, with the method for video processing, semantic recognition is performed on a video to be processed provided by a video providing user in a plurality of semantic recognition dimensions, and from the perspective of a plurality of video label data items obtained via semantic recognition, corresponding target video clips are generated based on an input of the user. This way, the video is recognized and understood more precisely and comprehensively, thereby improving the degree of precision and comprehensiveness in content representation of the target video clips, and at the same time improving the video processing efficiency for the video providing user.

Figure 7:
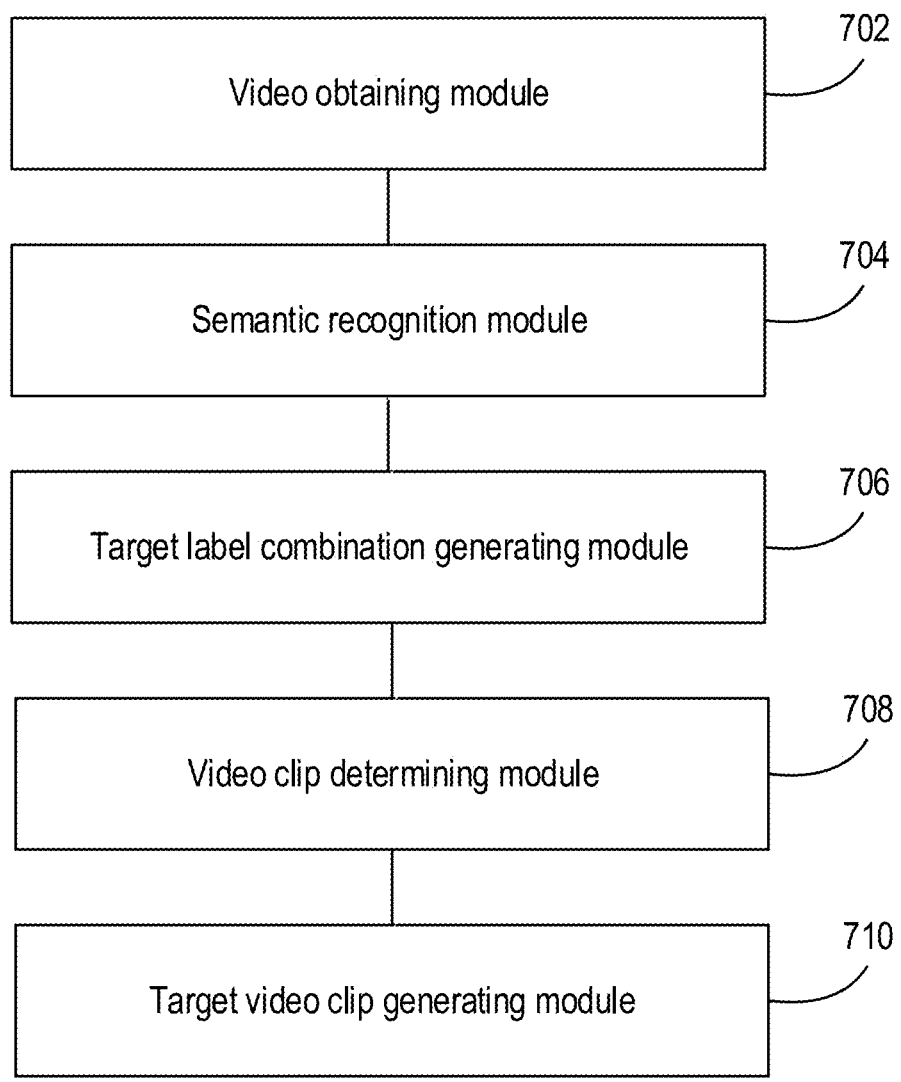
FIG. 7 is a block diagram illustrating an apparatus for video processing according to some embodiments of the disclosure.

FIG. 7 is a block diagram illustrating an apparatus for video processing apparatus according to some embodiments of the disclosure. Details of the apparatus that are substantially similar to those above-described embodiments are not repeated herein. In some embodiments and as shown herein, the apparatus includes: a video obtaining module (702), a semantic recognition module (704), a target label combination generating module (706), a video clip determining module (708), a target video clip generating module (710).

The video obtaining module (702) is configured to obtain a video to be processed submitted by a user.

The semantic recognition module (704) is configured to perform semantic recognition on the video in one or more semantic recognition dimensions to obtain one or more video label data items corresponding to the video in the one or more semantic recognition dimensions.

The target label combination generating module (706) is configured to generate a target label combination based on the video label data and an input of the user.

The video clip determining module (708) is configured to determine one or more video clips in the video corresponding to at least one video label in the target label combination.

The target video clip generating module (710) is configured to generate at least one target video clip corresponding to the target label combination based on at least one of the one or more video clips.

In some embodiments, the video label data items record video labels of the semantic recognition dimensions and playback time periods in the video corresponding to the video labels.

In some embodiments, the target label combination generating module (706) includes: a video search keyword obtaining sub-module configured to obtain video search keywords input by the user; a video label determining sub-module configured to determine one or more video labels in the one or more video label data items corresponding to the video search keywords; and a target label combination generating sub-module configured to generate the at least one target label combination based on the one or more video labels corresponding to the video search keywords.

In some embodiments, for one or more video clips in the video corresponding to the video labels, a start frame of the video clip is an image frame in the video corresponding to a start time point of the playback time period, and an end frame thereof is an image frame in the video corresponding to an end time point of the playback time period.

In some embodiments, the target video clip generating module (710) includes: a frame sequence extraction sub-module configured to extract one or more frame sequences corresponding to the one or more video clips from the video based on one or more playback time periods corresponding to the one or more video clips; and a target video clip generating sub-module configured to generate the target video clip based on the one or more frame sequences and a time sequence of playback time periods corresponding to the extracted one or more frame sequences.

In some embodiments, the target video clip generating module (710) includes: a playback time period determination sub-module configured to determine whether a plurality of playback time periods corresponding to the plurality of video clips are consecutive in time; and if so, execute a playback time period merging sub-module, a frame sequence extraction sub-module, and a target video clip generating sub-module, where the playback time period merging sub-module is configured to merge the plurality of playback time periods that are consecutive in time into at least one continuous playback time period; the frame sequence extraction sub-module is configured to extract at least one frame sequence in the video corresponding to the at least one continuous playback time period; and the target video clip generating sub-module is configured to generate the target video clip based on the at least one frame sequence and a time sequence of the at least one frame sequence.

In some embodiments, the video processing apparatus includes: a video label determining module configured to, when a plurality of target video clips is generated, determine video labels in the target label combination corresponding to each target video clip, respectively; a video clip score calculation module configured to calculate a video clip score of each target video clip based on label weights and label scores of the determined video labels, respectively; a target video clip filtering module configured to filter the plurality of target video clips to obtain target video clips having video clip scores satisfying a preset clip score threshold range; and a target video clip output module configured to output the obtained target video clips to the user in descending order of the video clip scores.

Figure 8:
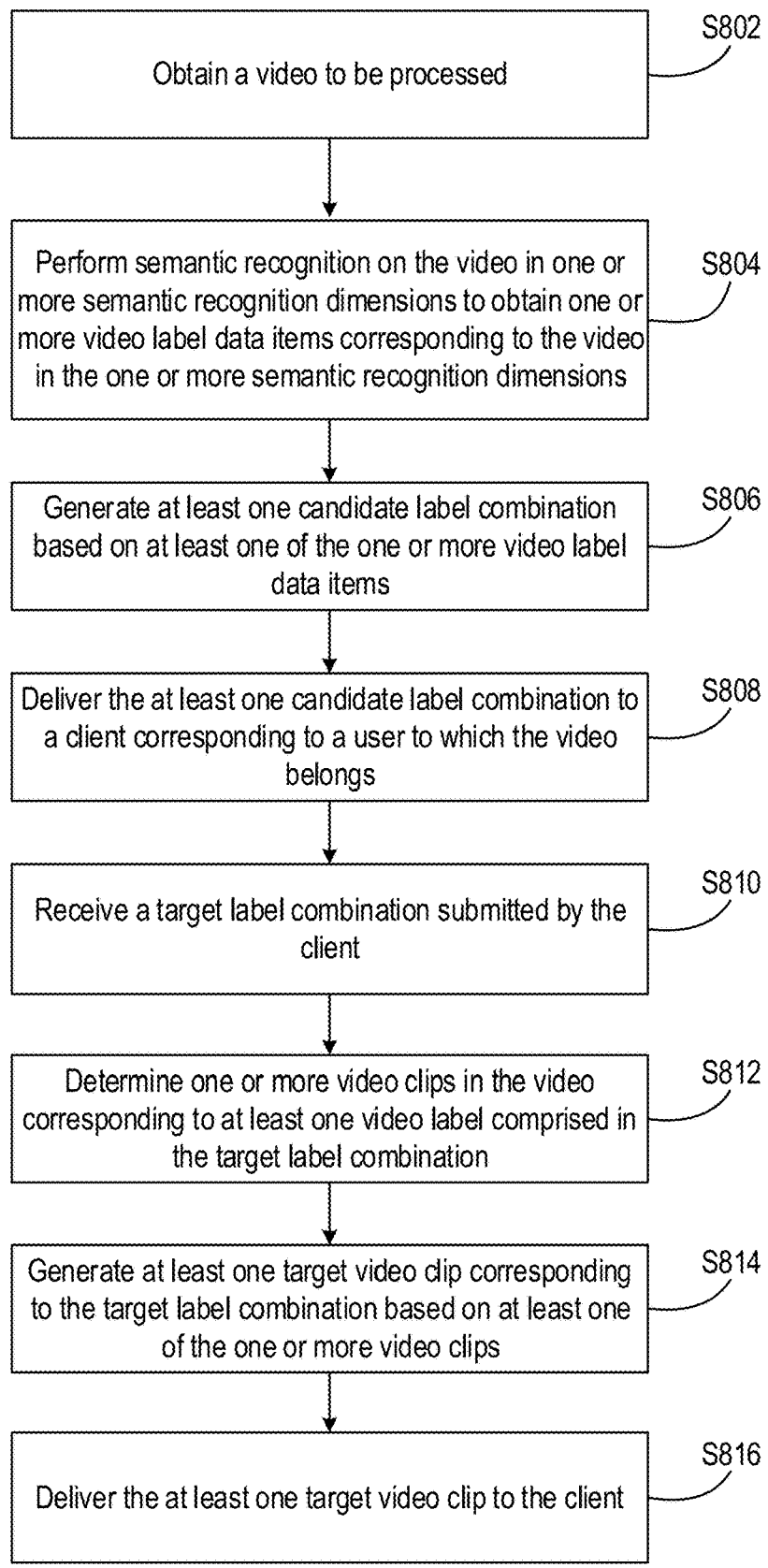
FIG. 8 is a flow diagram illustrating a method for video processing method according to some embodiments of the disclosure.

FIG. 8 is a flow diagram illustrating a method for video processing according to some embodiments. In some embodiments and as shown herein, the method includes the following steps.

Step S802: obtain a video to be processed.

In some embodiments, the video to be processed is a video uploaded by a video providing user via a client; or a video in a video repository imported based on the address information of the video repository after a video content provider (e.g., a video website, a video platform, or a video producer) uploads the address information.

Step S804: perform semantic recognition on the video in one or more semantic recognition dimensions to obtain one or more video label data items corresponding to the video in the one or more semantic recognition dimensions.

In some embodiments, to enhance the accuracy of semantic recognition on the video, semantic recognition is performed on the video in a specific semantic recognition dimension to obtain video label data of the video in the corresponding semantic recognition dimension. Based on this, to further enhance the comprehensiveness of semantic recognition on the video, and improve the comprehensiveness in content representation for the video using the video label data items obtained via semantic recognition, semantic recognition at a plurality of semantic recognition dimensions is further performed on the video in the corresponding semantic recognition dimensions to obtain a plurality of corresponding video label data items. The video label data items record video labels of the semantic recognition dimensions, and playback time periods in the video corresponding to the video labels.

As shown in FIG. 3, in one example, video processing staff associated with a video website selects soccer match video(s) (302) from a video repository of the video website as video(s) to be processed. In processing the soccer match video (e.g., in generating highlight clips of the soccer match video), semantic recognition is performed on the soccer match video in three semantic recognition dimensions: a referee behavior recognition dimension (304), a goal recognition dimension (306), and a star recognition dimension (308). The recognition result is specified as the following.

(1) video label data items (314) corresponding to the referee behavior recognition dimension (304) include: a red card label "Label a1" corresponding to a red card 1, and a playback time period in the soccer match video corresponding to the red card label "Label a1" is T_a1_start to T_a1_end; a red card label "Label a2" corresponding to a red card 2, and a playback time period in the soccer match video corresponding to the red card label "Label a2" is T_a2 start to T_a2_end.

(2) video label data items (316) corresponding to the goal action recognition dimension 306) includes: a goal celebration action label "Label 131" corresponding to a goal celebration 1, and a playback time period in the soccer match video corresponding to the goal celebration action label "Label 131" is T_b1_start to T_b1_end; a goal celebration action label "Label b2" corresponding to a goal celebration 2, and a playback time period in the soccer match video corresponding to the goal celebration action label "Label b2" is T_b2_start to T_b2_end; a goal celebration action label "Label b3" corresponding to a goal celebration 3, and a playback time period in the soccer match video corresponding to the goal celebration action label "Label b3" is T_b3_start to T_b3_end.

(3) video label data items (318) corresponding to the star recognition dimension (308) includes: a soccer star action label "Label c1" corresponding to a soccer star A, and playback time periods in the soccer match video corresponding to the soccer star action label "Label c1" are T_c1_start to T_c1_end, T_c2_start to T_c2_end, T_c3_start to T_c3_end, T_c4_start to T_c4_end, and T_c5_start to T_c5_end; a soccer star action label "Label c2" corresponding to a star B, and playback time periods in the soccer match video corresponding to the soccer star action label "Label c2" are T_c1_start to T_c1_end and T_c4_start to T_c4_end.

In implementations, in semantic recognition of the video in the one or more semantic recognition dimensions, semantic recognition models is used for implementation. In one example, the semantic recognition models are obtained by training at different semantic recognition dimensions, respectively. Videos are input to the semantic recognition model associated with each semantic recognition dimension obtained by training; and video label data items output by the semantic recognition model associated with each semantic recognition dimension is used as video label data items for the video in each semantic recognition dimension. Further, a semantic recognition model for semantic recognition in a plurality of semantic recognition dimensions is also be trained. In this case, videos are input to the semantic recognition model obtained by training, and the semantic recognition model performs semantic recognition on the video in the plurality of semantic recognition dimensions, respectively. Video label data items at the plurality of semantic recognition dimensions output by the semantic recognition model is used as video label data items for the video in the plurality of semantic recognition dimensions.

Step S806: generate at least one candidate label combination based on at least one of the one or more video label data items.

In implementations, if semantic recognition is performed on the video in a single semantic recognition dimension, based on video label data items obtained by performing semantic recognition on the video in the semantic recognition dimension, the candidate label combination is generated based on the obtained video label data items. If semantic recognition is performed on the video in a plurality of semantic recognition dimensions, based on generated video labels of the video in the plurality of semantic recognition dimensions, at least one candidate label combination is generated based on at least one of the video labels in the plurality of semantic recognition dimensions.

As shown in the example of FIG. 3, the video label data items corresponding to the referee behavior recognition dimension (304) includes the red card label Label a1 and the red card label Label a2; the video label data items corresponding to the goal action recognition dimension (306) includes the goal celebration action label Label 131, the goal celebration action label Label b2; and the video label data corresponding to the star recognition dimension (308) includes the goal celebration action label Label b3 comprised in and the star action label Label c1 and the star action label Label c2. As such, the combinations of the video label data items include the following.

Label a1-Label b1, Label a1-Label b2, Label a1-Label b3; Label a1-Label c1, Label a1-Label c2; Label a2-Label 131, Label a2-Label b2, Label a2-Label b3; Label a2-Label c1, Label a2-Label c2; Label b1-Label c1, Label b1-Label c2; Label b2-Label c1, Label b2-Label c2; Label b3-Label c1, Label b3-Label c2;

Label a1-Label b1-Label c1, Label a1-Label b1-Label c2, Label a1-Label b2-Label c1, Label a1-Label b2-Label c2, Label a1-Label b3-Label c1, Label a1-Label b3-Label c2; Label a2-Label b1-Label c1, Label a2-Label b1-Label c2, Label a2-Label b2-Label c1, Label a2-Label b2-Label c2, Label a2-Label b3-Label c1, Label a2-Label b3-Label c2;

Label a1-Label b1-Label c1-Label c2, Label a1-Label b2-Label c1-Label c2, Label a1-Label b3-Label c1-Label c2; Label a2-Label b1-Label c1-Label c2, Label a2-Label b2-Label c1-Label c2, Label a2-Label b3-Label c1-Label c2.

In some embodiments, when semantic recognition is performed on the video in a plurality of semantic recognition dimensions, for the playback time periods corresponding to generated video labels of the video in the plurality of semantic recognition dimensions, the playback time periods corresponding to some video labels coincide; while the playback time periods corresponding to other video labels do not coincide. For video labels corresponding to playback time periods not in coincidence, when these video labels are combined into a video label combination, a playback time segment determined in the video based on the video label combination is empty. Thus, in some embodiments, to improve the effectiveness of video processing, and at the same time prevent computing resources waste caused by useless video processing, the at least one candidate label combination is generated in the following manner.

First, extracting video labels in video label data corresponding to at least two semantic recognition dimensions in the plurality of semantic recognition dimensions, and corresponding playback time periods in the video, respectively. Next, determining whether the playback time periods corresponding to the video labels that correspond to the at least two semantic recognition dimensions coincide in time. If so, generating label combinations based on the video labels corresponding to the at least two semantic recognition dimensions as the candidate label combinations. Otherwise, performing no processing.

In implementations, in the case that the video is long or has complicated content, a large number of video label data items are recognized from the video at a plurality of semantic recognition dimensions. Accordingly, in the video label data items include a large number of video labels. In this case, in generating the candidate label combinations based on the video labels, a larger number of candidate label combinations are also generated. As such, it is difficult for the video processing staff of the video content provider or the video providing user, to make a quick selection when facing numerous candidate label combinations. In some embodiments, to reduce the selection difficulty for the video processing staff or the video providing user and improve the interactive experience of the video processing staff in video processing, the candidate label combinations are displayed in the following manner.

First, calculating a label combination score corresponding to each candidate label combination based on respective label weights and respective label scores of the video labels in the video label data items. Next, filtering the at least one candidate label combination to obtain candidate label combinations having label combination scores satisfying a preset score threshold range; and determining a display priority of the at least one candidate label combination in descending order of label combination scores.

Accordingly, in delivering the at least one candidate label combination to the client in the subsequent step, the at least one candidate label combination including the display priority is delivered to the client.

In some embodiments, the label weights of the video labels are preset or set by the video content provider or video providing user based on service requirements. The video content provider or video providing user may increase the label weights of the video labels in one or more semantic recognition dimensions or decrease the label weights of the video labels in one or more semantic recognition dimensions based on the collected video preferences of the user. As shown in the user interface of FIG. 4, in processing the soccer match video(s), the priority of the goal action recognition dimension (404) is raised to increase label weights of video labels in the goal action recognition dimension, the priority of the star recognition dimension (408) is raised to increase label weights of video labels in the star recognition dimension, and the priority of the referee behavior recognition dimension (402) is lowered to decrease label weights of video labels in the referee behavior recognition dimension. On the other hand, a scene playback recognition dimension (410) and a great pass and goal shooting recognition dimension (406) are not selected, resulting in no need to increase or decrease label weights of video labels in the two semantic recognition dimensions.

In some embodiments, the increase or decrease of a label weight of a video label is reflected in candidate label combinations displayed to the user. If the label weight of the video label is increased, a display priority of the candidate label combination including the video label corresponding to the label weight is accordingly raised; on the contrary, if the label weight of the video label is decreased, the display priority of the candidate label combination including the video label corresponding to the label weight is accordingly lowered.

In some embodiments, a label score of the video label is determined based on an occurrence frequency of the video label in the video, and the label score of the video label has a positive correlation with the occurrence frequency of the video label in the video. Further, in some embodiments, the label score is also set by the video content provider or video providing user based on service requirements, without limitation.

Step S808: deliver the at least one candidate label combination to a client corresponding to a user to which the video belongs.

Step S810: receive a target label combination submitted by the client.

Step S812: determine one or more video clips in the video corresponding to at least one video label in the target label combination.

In some embodiments, based on the target label combination received in the aforementioned step, here, one or more video clips in the video corresponding to at least one video label in the target label combination are determined, making preparation for the subsequent generation of the target video clips.

In some embodiments, for a video clip in the video corresponding to the video label, a start frame of the video clip is an image frame in the video corresponding to a start time point of the playback time period; and an end frame thereof is an image frame in the video corresponding to an end time point of the playback time period. As such, the video clip is a video clip formed by an image frame sequence between the start frame and the end frame in the video.

Still using the above example of the scenario of processing the soccer match video(s), the received target label combination submitted by the client is Label b2-Label c1. That is, video labels corresponding to the goal celebration actions of the star A are selected as the target label combination.

Here, the video clip in the soccer match video corresponding to the goal celebration action label Label b2 is: a video clip formed by an image frame sequence between a start image frame corresponding to T_b2_start and an end image frame corresponding to T_b2_end in the soccer match video.

Here, the star action label Label c1 corresponding to the star A corresponds to five video clips in the soccer match video, which are: a video clip formed by an image frame sequence between a start image frame corresponding to T_c1_start and an end image frame corresponding to T_c1_end in the soccer match video, a video clip formed by an image frame sequence between a start image frame corresponding to T_c2_start and an end image frame corresponding to T_c2_end in the soccer match video, a video clip formed by an image frame sequence between a start image frame corresponding to T_c3_start and an end image frame corresponding to T_c3_end in the soccer match video, a video clip formed by an image frame sequence between a start image frame corresponding to T_c4_start and an end image frame corresponding to T_c4_end in the soccer match video, and a video clip formed by an image frame sequence between a start image frame corresponding to T_c5_start and an end image frame corresponding to T_c5_end in the soccer match video, respectively.

Step S814: generate at least one target video clip corresponding to the target label combination based on at least one of the one or more video clips.

In implementations, at least one target video clip corresponding to the target label combination is generated by the following steps of: extracting one or more frame sequences corresponding to the one or more video clips from the video based on one or more playback time periods corresponding to the one or more video clips; and generating the target video clip based on the one or more frame sequences and a time sequence of playback time periods corresponding to the extracted one or more frame sequences.

Still using the aforementioned example of processing soccer match video(s), the user selects a target label combination Label b2-Label c1, two video labels in the target label combination Label b2-Label c1 correspond to a total of six video clips in the soccer match video, and six playback time periods in the soccer match video. Only T_b2_start to T_b2_end and T_c2_start to T_c2_end are the same playback time period in the six playback time periods. As such, only one video clip in the soccer match video satisfies the target label combination formed by the video labels that correspond to the goal celebration actions of the star A, namely, a video clip corresponding to the playback time period T_b2_start to T_b2_end (T_c2_start to T_c2_end). Accordingly, the video clip is extracted from the soccer match video as the target video clip (video highlight clip).

In some embodiments, the target video clip is generated from video clips satisfying all video labels in the target label combination. However, in implementations, in the case that the target label combination selected by the user includes a large number of video labels, the finally generated target video clip may be short, or the video may even not have any target video clip satisfying all video labels in the target label combination. To avoid this situation and improve the user satisfaction with the generated target video clip, in some embodiments, at least one target video clip corresponding to the target label combination is generated by the following manner steps of: determining whether a plurality of playback time periods corresponding to the plurality of video clips coincide in time; if so, performing deduplication (e.g., remove duplicated playback time periods) on the plurality of playback time periods to obtain at least one deduplicated playback time period; extracting at least one frame sequence in the video corresponding to the at least one deduplicated playback time period; and combining the at least one frame sequence into the target video clip based on a time sequence of the at least one deduplicated playback time period; if not, extracting a plurality of time frame sequences corresponding to the plurality of playback time periods in the video; and combining the plurality of frame sequences into the target video clip based on a time sequence of the plurality of time frame sequences.

Further, in the case that video labels in the target label combination selected by the user correspond to scattered playback time periods, the generated target video clip has poor content continuity (e.g., has many time segments of 5s long or even shorter) resulting in a poor experience of the viewing user in viewing. To avoid this situation and improve the user satisfaction with the finally generated target video clip, in some embodiments, at least one target video clip corresponding to the target label combination is generated by the following steps of: determining whether a plurality of playback time periods corresponding to the plurality of video clips are consecutive in time; if so, merging the plurality of playback time periods that are consecutive in time into at least one continuous playback time period; extracting at least one frame sequence in the video corresponding to the at least one continuous playback time period; and generating the target video clip based on the at least one frame sequence based on a time sequence of the at least one frame sequence; and if not, performing no processing.

In some embodiments, implementations similar to the above-described two ways of generating the target video clip can be used to generate the target video clip, without limitation. As such, to further improve the satisfaction of the video content provider or video providing user with the generated target video clip, in generating the target video clip, a plurality of different target video clips are generated using multiple implementations respectively and output to the video content provider or video providing user. In some embodiments, the target videos are scored and ranked, and then output to the video content provider or video providing user, to improve the experience of the video content provider or video providing user.

In some embodiments, the target video clips are scored, ranked, and output by the following steps of: when a plurality of target video clips is generated, determining video labels in the target label combination corresponding to each target video clip, respectively; calculating a video clip score of each target video clip based on label weights and label scores of the determined video labels, respectively; filtering the plurality of target video clips to obtain target video clips having video clip scores satisfying a preset clip score threshold range; and outputting the obtained target video clips to the user in a descending order of the video clip scores.

Accordingly, when the at least one target video clip is delivered to the client in the subsequent step, at least one obtained target video clip is delivered to the client, wherein the at least one target video clip includes a corresponding video clip score, respectively.

Step S816: deliver the at least one target video clip to the client.

According to various embodiments of the disclosure, with the method for video processing, semantic recognition is performed on a video to be processed provided by a video content provider in one or more semantic recognition dimensions, and from the perspective of a plurality of video label data items obtained through semantic recognition, and based on a selection of a user for candidate label combinations that are generated based on the video label data items, target video clips corresponding to the selection of the client are generated. This way, the video is recognized and understood more precisely and comprehensively, thereby improving the degree of precision and comprehensiveness in content representation of the target video clips, and at the same time improving the video processing efficiency for the video content provider.

Figure 9:
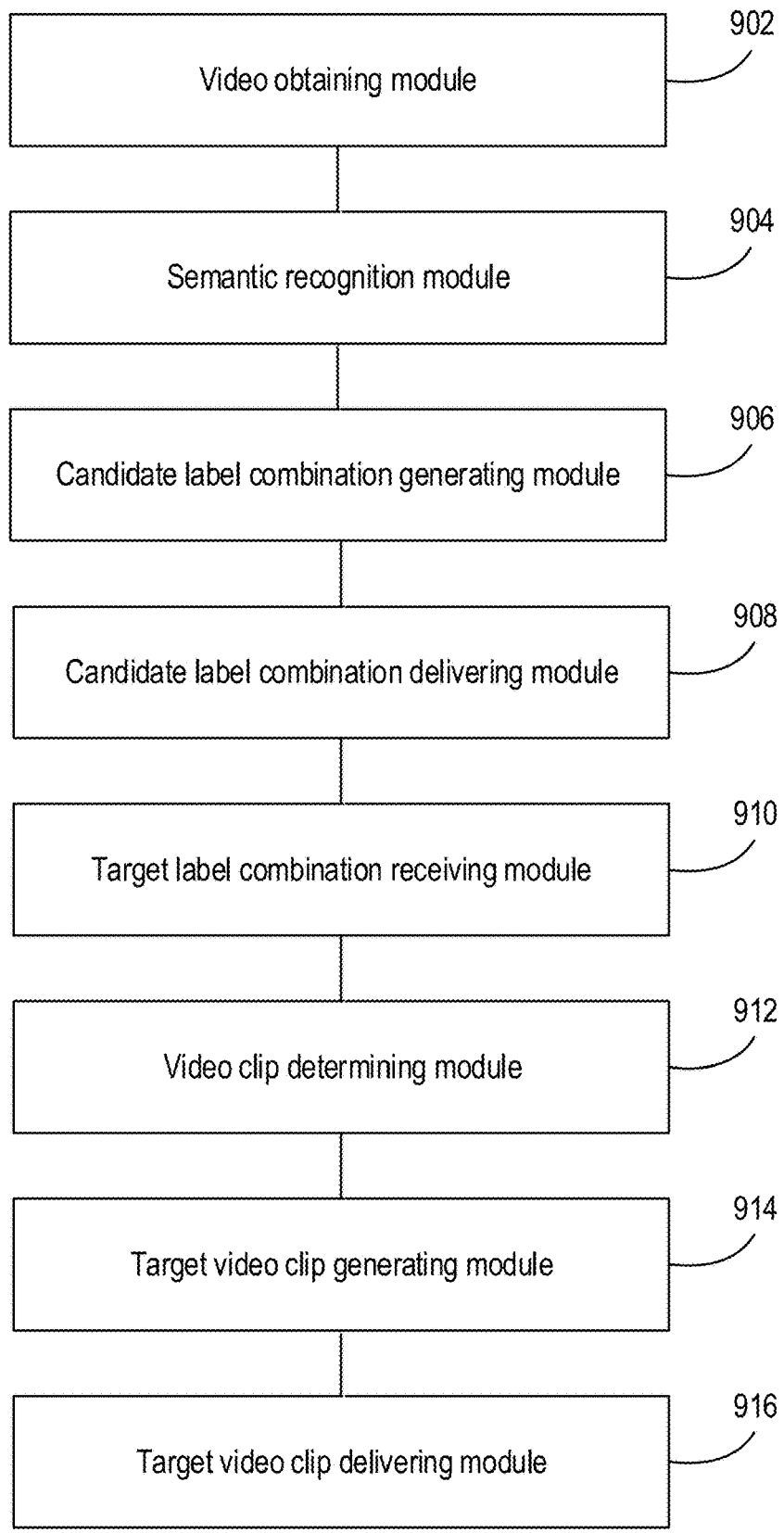
FIG. 9 is a block diagram illustrating an apparatus for video processing according to some embodiments of the disclosure.

FIG. 9 is a block diagram of an apparatus for video processing according to some embodiments. Details of the apparatus that are substantially similar to those above-described embodiments are not repeated herein. In some embodiments and as shown herein, the apparatus includes: a video obtaining module (902), a semantic recognition module (904), a candidate label combination generating module (906), a candidate label combination delivering module (908), a target label combination receiving module (910), a video clip determining module (912), a video clip determining module (912), a video clip determining module (914), a target video clip delivering module (916).

The video obtaining module (902) is configured to obtain a video to be processed.

The semantic recognition module (904) is configured to perform semantic recognition on the video in one or more semantic recognition dimensions to obtain one or more video label data items corresponding to the video in the one or more semantic recognition dimensions.

The candidate label combination generating module (906) is configured to generate at least one candidate label combination based on at least one of the one or more video label data items.

The candidate label combination delivering module (908) is configured to deliver the at least one candidate label combination to a client corresponding to a user to which the video belongs.

The target label combination receiving module (910) is configured to receive a target label combination submitted by the client.

The video clip determining module (912) is configured to determine one or more video clips in the video corresponding to at least one video label in the target label combination.

The video clip determining module (914) is configured to generate at least one target video clip corresponding to the target label combination based on at least one of the one or more video clips.

The target video clip delivering module (916) is configured to deliver the at least one target video clip to the client.

In some embodiments, the video label data records video labels of the semantic recognition dimensions and playback time periods in the video corresponding to the video labels.

In some embodiments, the candidate label combination generating module (906) includes: an extraction sub-module configured to extract video labels in video label data corresponding to at least two semantic recognition dimensions in the plurality of semantic recognition dimensions and corresponding playback time periods in the video, respectively; a determination sub-module configured to determine whether the playback time periods corresponding to the video labels that correspond to the at least two semantic recognition dimensions coincide in time; and if so, execute a generation sub-module, where the generation sub-module is configured to generate label combinations based on the video labels corresponding to the at least two semantic recognition dimensions as the candidate label combinations.

In some embodiments, the video processing apparatus includes: a label combination score calculation module configured to calculate a label combination score corresponding to each candidate label combination based on label weights and label scores of the video labels in the video label data, respectively; a candidate label combination filtering module configured to filter the at least one candidate label combination to obtain candidate label combinations having label combination scores satisfying a preset score threshold range; and a display priority determining module configured to determine a display priority of the at least one candidate label combination in a descending order of label combination scores.

Accordingly, the candidate label combination delivering module (908) is further configured to deliver to the client the at least one candidate label combination including the display priority.

In some embodiments, for one or more video clips in the video corresponding to the video labels, a start frame of the video clip is an image frame in the video corresponding to a start time point of the playback time period, and an end frame thereof is an image frame in the video corresponding to an end time point of the playback time period.

In some embodiments, the target video clip generating module (914) includes: a frame sequence extraction sub-module configured to extract one or more frame sequences corresponding to the one or more video clips from the video based on one or more playback time periods corresponding to the one or more video clips; and a target video clip generating sub-module configured to generate the target video clip based on the one or more frame sequences and a time sequence of playback time periods corresponding to the extracted one or more frame sequences.

In some embodiments, the target video clip generating module (914) includes: a first playback time period determination sub-module configured to determine whether a plurality of playback time periods corresponding to the plurality of video clips coincide in time; if so, execute a playback time period deduplication sub-module, a first playback time period extraction sub-module, and a first frame sequence combining sub-module, where the playback time period deduplication sub-module is configured to perform time deduplication on the plurality of playback time periods to obtain at least one deduplicated playback time period; the first playback time period extraction sub-module is configured to extract at least one frame sequence in the video corresponding to the at least one deduplicated playback time period; the first frame sequence combining sub-module is configured to combine the at least one frame sequence into the target video clip based on a time sequence of the at least one deduplicated playback time period; and a second playback time period determination sub-module configured to determine whether a plurality of playback time periods corresponding to the plurality of video clips are consecutive in time; if so, execute a playback time period merging sub-module, a frame sequence extraction sub-module, and a second frame sequence combining sub-module, where the playback time period merging sub-module is configured to merge the plurality of playback time periods that are consecutive in time into at least one continuous playback time period; the frame sequence extraction sub-module is configured to extract at least one frame sequence in the video corresponding to the at least one continuous playback time period; and the second frame sequence combining sub-module is configured to combine the at least one frame sequence into the target video clip based on a time sequence of the at least one continuous playback time period.

In some embodiments, the video processing apparatus includes: a video label determining module configured to, if a plurality of target video clips is generated, determine video labels in the target label combination corresponding to each target video clip, respectively; a video clip score calculation module configured to calculate a video clip score of each target video clip based on label weights and label scores of the determined video labels, respectively; and a target video clip filtering module configured to filter the plurality of target video clips to obtain target video clips having video clip scores satisfying a preset clip score threshold range.

Accordingly, the target video clip delivering module (916) is further configured to deliver at least one obtained target video clip to the client, wherein the at least one target video clip includes a corresponding video clip score, respectively.

Figure 10:
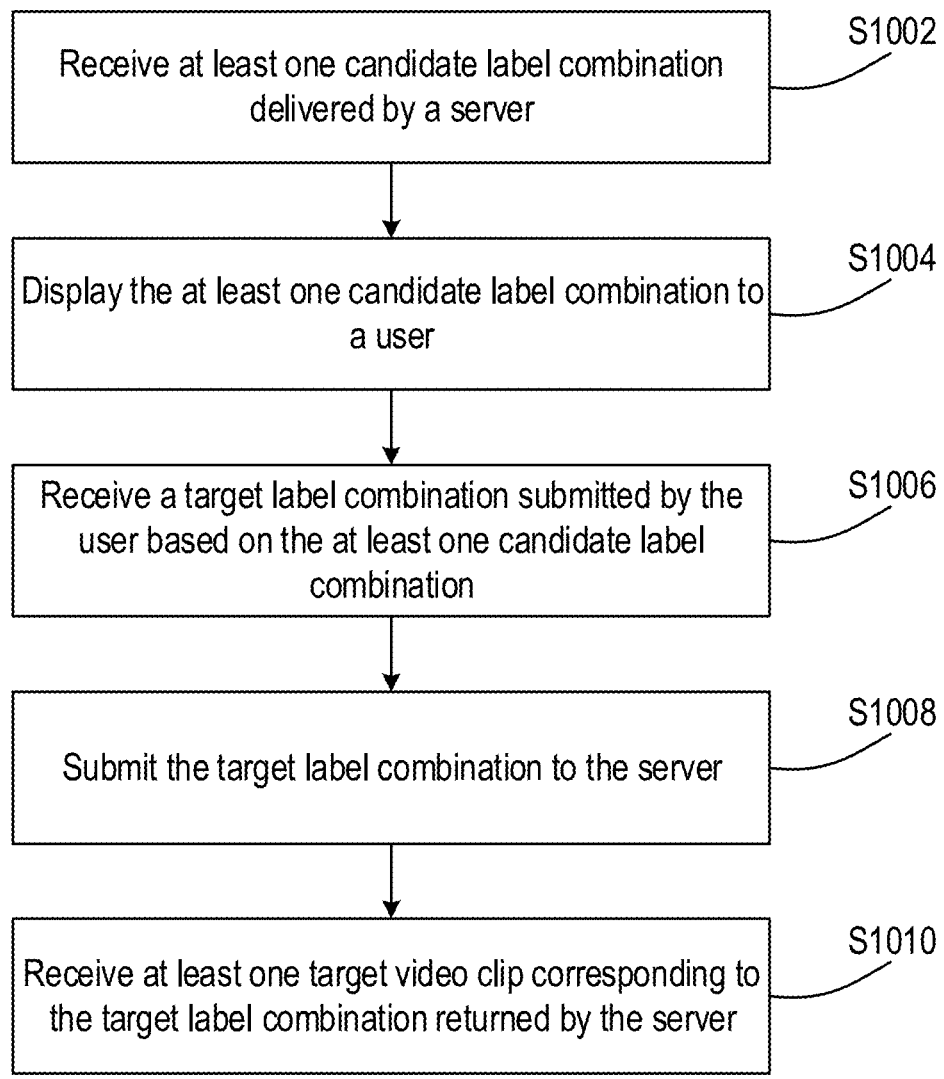
FIG. 10 is a flow diagram illustrating a method for video processing method according to some embodiments of the disclosure.

FIG. 10 is a flow diagram illustrating a method for video processing according to some embodiments. In some embodiments and as shown herein, the method includes the following steps.

Step S1002: receive at least one candidate label combination delivered by a server.

Step S1004: display the at least one candidate label combination to a user.

Step S1006: receive a target label combination submitted by the user based on the at least one candidate label combination.

Step S1008: submit the target label combination to the server.

Step S1010: receive at least one target video clip corresponding to the target label combination returned by the server.

In some embodiments, the at least one candidate label combination delivered by the server includes a display priority for the at least one candidate label combination. Accordingly, displaying the at least one candidate label combination to a user comprises displaying the at least one candidate label combination to the user based on the display priority.

In some embodiments, the at least one target video clip corresponding to the target label combination returned by the server respectively includes a corresponding video clip score. Accordingly, after receiving at least one target video clip corresponding to the target label combination and returned by the server, the method further includes displaying the at least one target video clip to the user in a descending order of the video clip scores.

According to various embodiments of the disclosure, with the method for video processing, when at least one candidate label combination delivered by a server is received, based on a target label combination selected by a user from the at least one candidate label combination, at least one target video clip returned by the server based on the target label combination selected by the user is received, thereby improving the interaction experience of the user in video processing.

Figure 11:
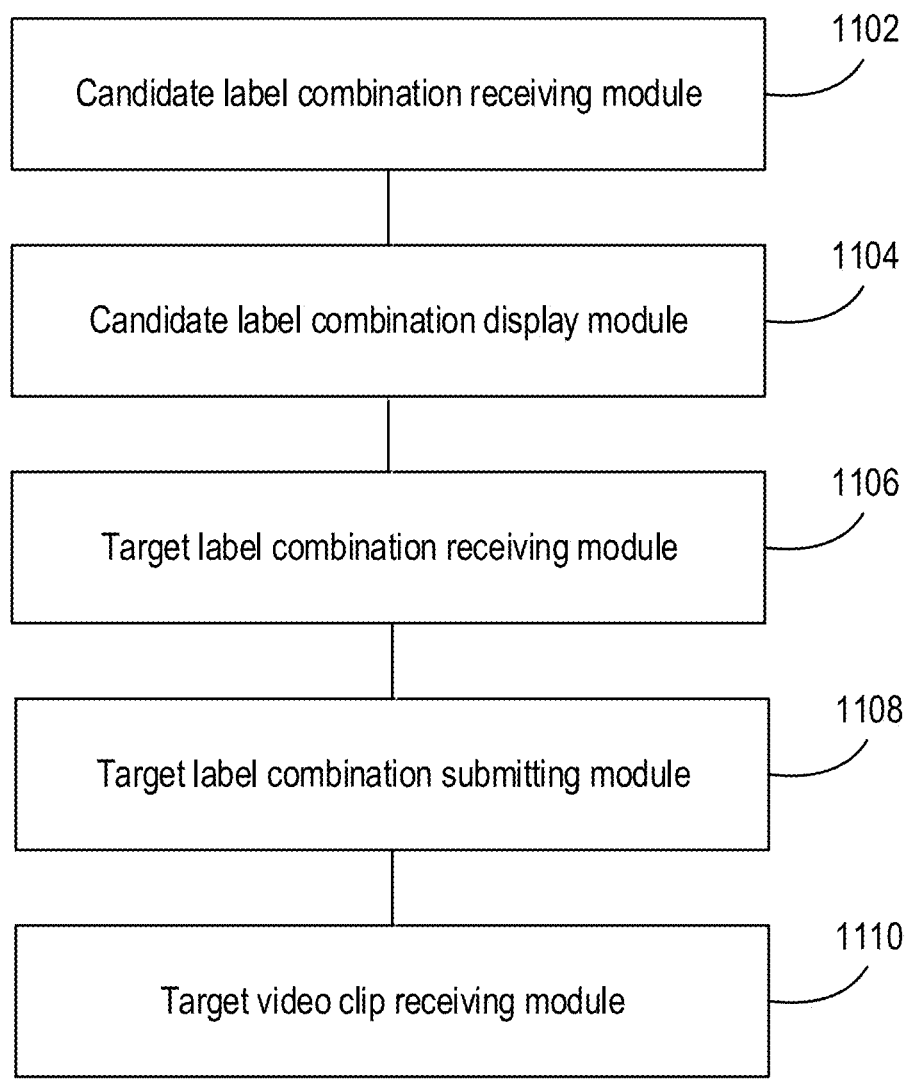
FIG. 11 is a block diagram illustrating an apparatus for video processing according to some embodiments of the disclosure.

FIG. 11 is a block diagram illustrating an apparatus for video processing according to some embodiments. Details of the apparatus that are substantially similar to those above-described embodiments are not repeated herein. In some embodiments and as shown herein, the apparatus includes: a candidate label combination receiving module (1102), a candidate label combination display module (1104), a target label combination receiving module (1106), a target label combination submitting module (1108), and a target video clip receiving module (1110).

The candidate label combination receiving module (1102) is configured to receive at least one candidate label combination delivered by a server.

The candidate label combination display module (1104) is configured to display the at least one candidate label combination to a user.

The target label combination receiving module (1106) is configured to receive a target label combination submitted by the user based on the at least one candidate label combination.

The target label combination submitting module (1108) is configured to submit the target label combination to the server.

The target video clip receiving module (1110) is configured to receive at least one target video clip corresponding to the target label combination returned by the server.

In some embodiments, the at least one candidate label combination delivered by the server includes a display priority of the at least one candidate label combination. Accordingly, the candidate label combination display module (1104) is further configured to display the at least one candidate label combination to the user based on the display priority.

In some embodiments, the at least one target video clip corresponding to the target label combination returned by the server respectively includes a corresponding video clip score. Accordingly, the video processing apparatus further includes a target video clip display module configured to display the at least one target video clip to the user in a descending order of the video clip scores.

Figure 12:
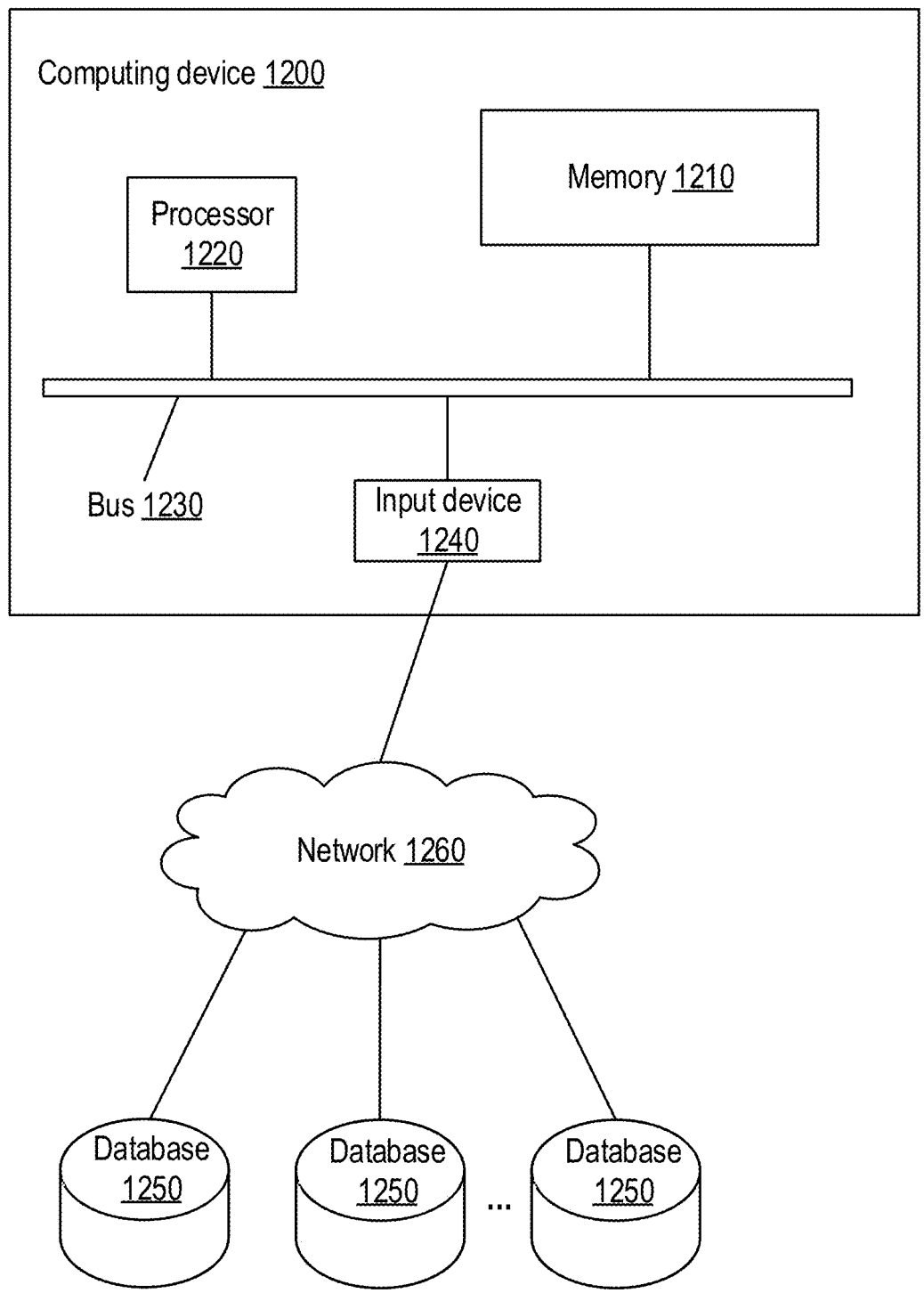
FIG. 12 is a block diagram illustrating a computing device according to some embodiments of the disclosure.

FIG. 12 is a block diagram illustrating a computing device according to some embodiments of the disclosure. In some embodiments and as shown herein, the computing device (1200) include: a memory (1210) and a processor (1220). The processor (1220) and the memory (1210) are connected via a bus (1230), and a database (1250) is used to store data.

In some embodiments, the computing device (1200) further includes an input device (1240) that enables the computing device (1200) to communicate via one or a plurality of networks (1260). Examples of these networks include public switched telephone networks (PSTNs), local area networks (LANs), wide area networks (WANs), personal area networks (PANs), or a combination of communication networks such as the Internet. The access device 1240 may include one or a plurality of any type of wired or wireless network interfaces (for example, a network interface card (NIC)), such as IEEE802.11 wireless local area network (WLAN) wireless interfaces, Worldwide Interoperability for Microwave Access (Wi-MAX) interfaces, Ethernet interfaces, universal serial bus (USB) interfaces, cellular network interfaces, Bluetooth interfaces, near-field communication (NFC) interfaces, etc.

In embodiments of the disclosure, the above components of the computing device (1200) and other components not shown in FIG. 12 may also be connected to each other, e.g., via a bus. It should be understood that the block diagram of the computing device shown in FIG. 12 is presented only for illustrative purposes, and is not intended to limit the scope of the disclosure. Those skilled in the art can add or replace any components as needed.

The computing device (1200) can be any type of stationary or mobile computing device, including mobile computers or mobile computing devices (for example, a tablet computer, a personal digital assistant, a laptop computer, a notebook computer, and a netbook computer), mobile phones (for example, a smart cellphone), wearable computing devices (for example, a smart watch, and smart glasses), or other types of mobile devices, or stationary computing devices such as a desktop computer or a PC. The computing device 1200 can also be a mobile or stationary server.

In some embodiments, the processor 1220 is configured to execute the computer instructions stored in the memory to perform the following steps of obtaining at least one video from a video repository as a video to be processed; performing semantic recognition on the video in one or more semantic recognition dimensions to obtain one or more video label data items corresponding to the video in the one or more semantic recognition dimensions; generating at least one candidate label combination based on at least one of the one or more video label data items; determining, based on a target label combination selected by a user from the at least one candidate label combination, one or more video clips in the video corresponding to at least one video label in the target label combination; and generating at least one target video clip corresponding to the target label combination based on at least one of the one or more video clips.

In some embodiments, the processor 1220 is configured to execute the computer instructions stored in the memory to perform the following steps of: obtaining a video to be processed submitted by a user; performing semantic recognition on the video in one or more semantic recognition dimensions to obtain one or more video label data items corresponding to the video in the one or more semantic recognition dimensions; generating a target label combination based on the video label data and an input of the user; determining one or more video clips in the video corresponding to at least one video label in the target label combination; generating at least one target video clip corresponding to the target label combination based on at least one of the one or more video clips.

In some embodiments, the processor 1220 is configured to execute the computer instructions stored in the memory to perform the following steps of obtaining a video to be processed; performing semantic recognition on the video in one or more semantic recognition dimensions to obtain one or more video label data items corresponding to the video in the one or more semantic recognition dimensions; generating at least one candidate label combination based on at least one of the one or more video label data items; delivering the at least one candidate label combination to a client corresponding to a user to which the video belongs receiving a target label combination submitted by the client; determining one or more video clips in the video corresponding to at least one video label in the target label combination; generating at least one target video clip corresponding to the target label combination based on at least one of the one or more video clips; an delivering the at least one target video clip to the client.

In some embodiments, the processor 1220 is configured to execute the computer instructions stored in the memory to perform the following steps of: receiving at least one candidate label combination delivered by a server; displaying the at least one candidate label combination to a user; receiving a target label combination submitted by the user based on the at least one candidate label combination; submitting the target label combination to the server; and receiving at least one target video clip corresponding to the target label combination returned by the server.

In some embodiments, computer-readable storage media are provided for storing computer instructions, when executed by a processor, implement the steps of the video processing methods as described in the disclosure. Details of the computer-readable storage medium that are substantially similar to those described above are not repeated herein.

The specific embodiments of the disclosure have been described above. Other embodiments fall within the scope of the appended claims. In some cases, the actions or steps recited in the claims may be performed in a different order than in the embodiments and still achieve the desired results. In addition, the processes depicted in the drawings do not necessarily require the illustrated particular order or consecutive order to achieve the desired results. In some implementations, multitask processing and parallel processing are also possible or favorable.

The computer instructions include computer program code, which may be in the form of source code, object code, executable files, or some intermediate forms. The computer-readable medium may include: any entity or device capable of including the computer program code, a recording medium, a USB flash disk, a mobile hard disk, a magnetic disk, an optical disc, a computer memory, a read-only memory (ROM), a random access memory (RAM), electrical carrier signals, telecommunication signals, and a software distribution medium. It should be noted that the content contained in the computer-readable medium can be appropriately added or deleted in accordance with the requirements of the legislation and patent practice in the jurisdiction. For example, in some jurisdictions, based on the legislation and patent practice, the computer-readable medium does not include electrical carrier signals and telecommunication signals.

It should be noted that for simplicity of description, the above method embodiments are all expressed as a combination of a series of actions, but those skilled in the art should know that the embodiments of the disclosure are not limited by the described sequence of actions, because some steps can be performed in other orders or simultaneously based on the embodiments of the disclosure. Furthermore, those skilled in the art should also know that the embodiments described herein are all preferred embodiments, and the involved actions and modules are not necessarily all required by the embodiments of the disclosure.

In the above embodiments, the description of each embodiment has its own emphasis. For parts that are not described in detail in a certain embodiment, reference can be made to related descriptions of other embodiments.

The embodiments of the disclosure above are only disclosed to facilitate explanation of the disclosure. The details of the optional embodiments are not elaborated herein, and are not intended to be limiting. Obviously, many modifications and changes can be made based on the content of the embodiments of the disclosure. The disclosure selects and specifically describes these embodiments in order to better explain the principles and actual applications of the embodiments of the disclosure, so that those skilled in the art can understand and use the disclosure appropriately. The disclosure is limited only by the claims and the full scope and equivalents thereof.

What is claimed is:

1. A method, comprising:
    obtaining a video from a video repository;
    performing semantic recognition on the video in a plurality of semantic recognition dimensions to obtain one or more video label data items corresponding to the video in the plurality of semantic recognition dimensions, the video label data items comprising video labels of the plurality of semantic recognition dimensions and corresponding playback time periods;
    identifying a plurality of video clips in the video, a given video clip having a start frame and an end frame, the start frame comprising a start time point of a playback time period and the end frame comprising an image frame in the video corresponding to an end time point of the playback time period;
    generating at least one candidate label combination based on at least one of the one or more video label data items;
    determining, based on a target label combination selected by a user from the at least one candidate label combination, one or more video clips in the video corresponding to at least one video label in the target label combination; and
    generating at least one target video clip corresponding to the target label combination based on at least one of the one or more video clips by:
        determining whether a plurality of playback time periods corresponding to the plurality of video clips coincide in time;
        responsive to determining that the plurality of playback time periods corresponding to the plurality of video clips coincide in time, performing time deduplication on the plurality of playback time periods to obtain at least one deduplicated playback time period;

extracting at least one frame sequence in the video corresponding to the at least one deduplicated playback time period; and combining the at least one frame sequence into the target video clip based on a time sequence of the at least one deduplicated playback time period.

2. The method of claim 1, the generating at least one candidate label combination based on at least one of the one or more video label data items comprising:

extracting video labels in video label data corresponding to at least two semantic recognition dimensions in the plurality of semantic recognition dimensions and corresponding playback time periods in the video, respectively;

determining whether the playback time periods corresponding to the video labels that correspond to the at least two semantic recognition dimensions coincide in time; and responsive to determining that the playback time periods corresponding to the video labels that correspond to the at least two semantic recognition dimensions coincide in time, generating label combinations based on the video labels corresponding to the at least two semantic recognition dimensions as the candidate label combinations.

3. The method of claim 2, further comprising, after generating at least one candidate label combination based on at least one of the one or more video label data items, and before determining, based on a target label combination selected by a user from the at least one candidate label combination, one or more video clips in the video corresponding to at least one video label in the target label combination:

calculating a label combination score corresponding to each candidate label combination based on label weights and label scores of the video labels in the video label data, respectively;

filtering the at least one candidate label combination to obtain candidate label combinations having label combination scores satisfying a preset score threshold range; and displaying the obtained candidate label combinations to the user in a descending display order of the label combination scores.

4. The method of claim 1, the generating at least one target video clip corresponding to the target label combination based on at least one of the one or more video clips comprising:

extracting one or more frame sequences corresponding to the one or more video clips from the video based on one or more playback time periods corresponding to the one or more video clips; and generating the target video clip based on the one or more frame sequences and a time sequence of playback time periods corresponding to the extracted one or more frame sequences.

5. The method of claim 1, further comprising, after generating at least one target video clip corresponding to the target label combination based on at least one of the one or more video clips is performed:

responsive to a plurality of target video clips generated, determining video labels in the target label combination corresponding to each target video clip, respectively;

calculating a video clip score of each target video clip based on label weights and label scores of the determined video labels, respectively;

filtering the plurality of target video clips to obtain target video clips having video clip scores satisfying a preset clip score threshold range; and outputting the obtained target video clips to the user in a descending order of the video clip scores.

6. An apparatus comprising:

a processor; and a storage medium for tangibly storing thereon program logic for execution by the processor, the stored program logic comprising:

logic, executed by the processor, for obtaining a video from a video repository, logic, executed by the processor, for performing semantic recognition on the video in a plurality of semantic recognition dimensions to obtain one or more video label data items corresponding to the video in the plurality of semantic recognition dimensions, the video label data items comprising video labels of the plurality of semantic recognition dimensions and corresponding playback time periods;

logic, executed by the processor, for identifying a plurality of video clips in the video, a given video clip having a start frame and an end frame, the start frame comprising a start time point of a playback time period and the end frame comprising an image frame in the video corresponding to an end time point of the playback time period, logic, executed by the processor, for generating at least one candidate label combination based on at least one of the one or more video label data items, logic, executed by the processor, for determining, based on a target label combination selected by a user from the at least one candidate label combination, one or more video clips in the video corresponding to at least one video label in the target label combination, and logic, executed by the processor, for generating at least one target video clip corresponding to the target label combination based on at least one of the one or more video clips by:

determining whether a plurality of playback time periods corresponding to the plurality of video clips coincide in time;

responsive to determining that the plurality of playback time periods corresponding to the plurality of video clips coincide in time, performing time deduplication on the plurality of playback time periods to obtain at least one deduplicated playback time period;

extracting at least one frame sequence in the video corresponding to the at least one deduplicated playback time period; and combining the at least one frame sequence into the target video clip based on a time sequence of the at least one deduplicated playback time period.

7. The apparatus of claim 6, the video label data items recording video labels of the plurality of semantic recognition dimensions and playback time periods in the video corresponding to the video labels.

8. The apparatus of claim 7, the logic for generating at least one candidate label combination based on at least one of the one or more video label data items comprising:

logic, executed by the processor, for extracting video labels in video label data corresponding to at least two semantic recognition dimensions in the plurality of semantic recognition dimensions and corresponding playback time periods in the video, respectively, logic, executed by the processor, for determining whether the playback time periods corresponding to the video labels that correspond to the at least two semantic recognition dimensions coincide in time, and logic, executed by the processor, for, responsive to determining that the playback time periods corresponding to the video labels that correspond to the at least two semantic recognition dimensions coincide in time, generating label combinations based on the video labels corresponding to the at least two semantic recognition dimensions as the candidate label combinations.

9. The apparatus of claim 6, the logic for generating at least one target video clip corresponding to the target label combination based on at least one of the one or more video clips comprising:

logic, executed by the processor, for extracting one or more frame sequences corresponding to the one or more video clips from the video based on one or more playback time periods corresponding to the one or more video clips, and logic, executed by the processor, for generating the target video clip based on the one or more frame sequences and a time sequence of playback time periods corresponding to the extracted one or more frame sequences.

10. The apparatus of claim 6, the stored program logic further comprising:

logic, executed by the processor, for, responsive to a plurality of target video clips generated, determining video labels in the target label combination corresponding to each target video clip, respectively, logic, executed by the processor, for calculating a video clip score of each target video clip based on label weights and label scores of the determined video labels, respectively, logic, executed by the processor, for filtering the plurality of target video clips to obtain target video clips having video clip scores satisfying a preset clip score threshold range, logic, executed by the processor, for extracting at least one frame sequence in the video corresponding to at least one deduplicated playback time period, and logic, executed by the processor, for outputting the obtained target video clips to the user in a descending order of the video clip scores.

11. A non-transitory computer-readable storage medium for tangibly storing computer program instructions capable of being executed by a computer processor, the computer program instructions defining the steps of:

obtaining a video from a video repository;

performing semantic recognition on the video in a plurality of semantic recognition dimensions to obtain one or more video label data items corresponding to the video in the plurality of semantic recognition dimensions, the video label data items comprising video labels of the plurality of semantic recognition dimensions and corresponding playback time periods;

identifying a plurality of video clips in the video, a given video clip having a start frame and an end frame, the start frame comprising a start time point of a playback time period and the end frame comprising an image frame in the video corresponding to an end time point of the playback time period;

generating at least one candidate label combination based on at least one of the one or more video label data items;

determining, based on a target label combination selected by a user from the at least one candidate label combination, one or more video clips in the video corresponding to at least one video label in the target label combination; and generating at least one target video clip corresponding to the target label combination based on at least one of the one or more video clips by:

determining whether a plurality of playback time periods corresponding to the plurality of video clips coincide in time;

responsive to determining that the plurality of playback time periods corresponding to the plurality of video clips coincide in time, performing time deduplication on the plurality of playback time periods to obtain at least one deduplicated playback time period;

extracting at least one frame sequence in the video corresponding to the at least one deduplicated playback time period; and combining the at least one frame sequence into the target video clip based on a time sequence of the at least one deduplicated playback time period.

12. The computer-readable storage medium of claim 11, the video label data items recording video labels of the plurality of semantic recognition dimensions and playback time periods in the video corresponding to the video labels.

13. The computer-readable storage medium of claim 12, the generating at least one candidate label combination based on at least one of the one or more video label data items comprising:

extracting video labels in video label data corresponding to at least two semantic recognition dimensions in the plurality of semantic recognition dimensions and corresponding playback time periods in the video, respectively;

determining whether the playback time periods corresponding to the video labels that correspond to the at least two semantic recognition dimensions coincide in time; and responsive to determining that the playback time periods corresponding to the video labels that correspond to the at least two semantic recognition dimensions coincide in time, generating label combinations based on the video labels corresponding to the at least two semantic recognition dimensions as the candidate label combinations.

14. The computer-readable storage medium of claim 13, the computer program instructions defining the steps of: after generating at least one candidate label combination based on at least one of the one or more video label data items, and before determining, based on a target label combination selected by a user from the at least one candidate label combination, one or more video clips in the video corresponding to at least one video label in the target label combination:

calculating a label combination score corresponding to each candidate label combination based on label weights and label scores of the video labels in the video label data, respectively;

filtering the at least one candidate label combination to obtain candidate label combinations having label combination scores satisfying a preset score threshold range; and displaying the obtained candidate label combinations to the user in a descending display order of the label combination scores.

* * * * *